United States Patent
Matsumoto et al.

(10) Patent No.: US 7,764,680 B2
(45) Date of Patent: Jul. 27, 2010

(54) COMMUNICATION SYSTEM AND CALL CONTROL SERVER

(75) Inventors: Norihisa Matsumoto, Fuchu (JP); Koji Watanabe, Kokubunji (JP); Naruhito Nakahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 674 days.

(21) Appl. No.: 11/621,219

(22) Filed: Jan. 9, 2007

(65) Prior Publication Data

US 2007/0160056 A1 Jul. 12, 2007

(30) Foreign Application Priority Data

Jan. 10, 2006 (JP) .............................. 2006-001993

(51) Int. Cl.
*H04L 12/28* (2006.01)
(52) U.S. Cl. ..................... 370/389; 370/328; 370/338
(58) Field of Classification Search ........................ None
See application file for complete search history.

(56) References Cited

U.S. PATENT DOCUMENTS

| | | | | |
|---|---|---|---|---|
| 7,389,537 | B1 * | 6/2008 | Callon et al. .................. | 726/22 |
| 7,466,652 | B2 * | 12/2008 | Lau et al. ................. | 370/230.1 |
| 2002/0196743 | A1 * | 12/2002 | Thalanany et al. ........... | 370/252 |
| 2003/0220102 | A1 * | 11/2003 | Kallio ...................... | 455/422.1 |
| 2004/0052212 | A1 | 3/2004 | Baillargeon | |
| 2004/0243720 | A1 * | 12/2004 | Haumont et al. ............ | 709/245 |
| 2005/0059396 | A1 * | 3/2005 | Chuah et al. ............. | 455/435.1 |
| 2006/0045128 | A1 * | 3/2006 | Madour ...................... | 370/466 |
| 2006/0148485 | A1 * | 7/2006 | Kangas et al. ............... | 455/453 |

FOREIGN PATENT DOCUMENTS

| | | |
|---|---|---|
| JP | 6-105360 | 4/1994 |
| JP | 10-336321 | 12/1998 |

* cited by examiner

*Primary Examiner*—Jayanti K Patel
*Assistant Examiner*—Anthony Sol
(74) *Attorney, Agent, or Firm*—Mattingly & Malur, P.C.

(57) ABSTRACT

When congestion occurs in a RAN in a cell phone VoIP service, calls using the congested device are detected to permit generation of a restriction in call by call units. The congested device notifies call connection data passing through it to a PDSN, the PDSN finds the IP address of the terminal using the target connection, and notifies a CSCF as a restriction target terminal. The CSCF, in call connection processing, determines whether the calling/called sending/receiving user is the restriction target, and if so, determines whether or not the call should be connected with priority from subscriber data.

6 Claims, 21 Drawing Sheets

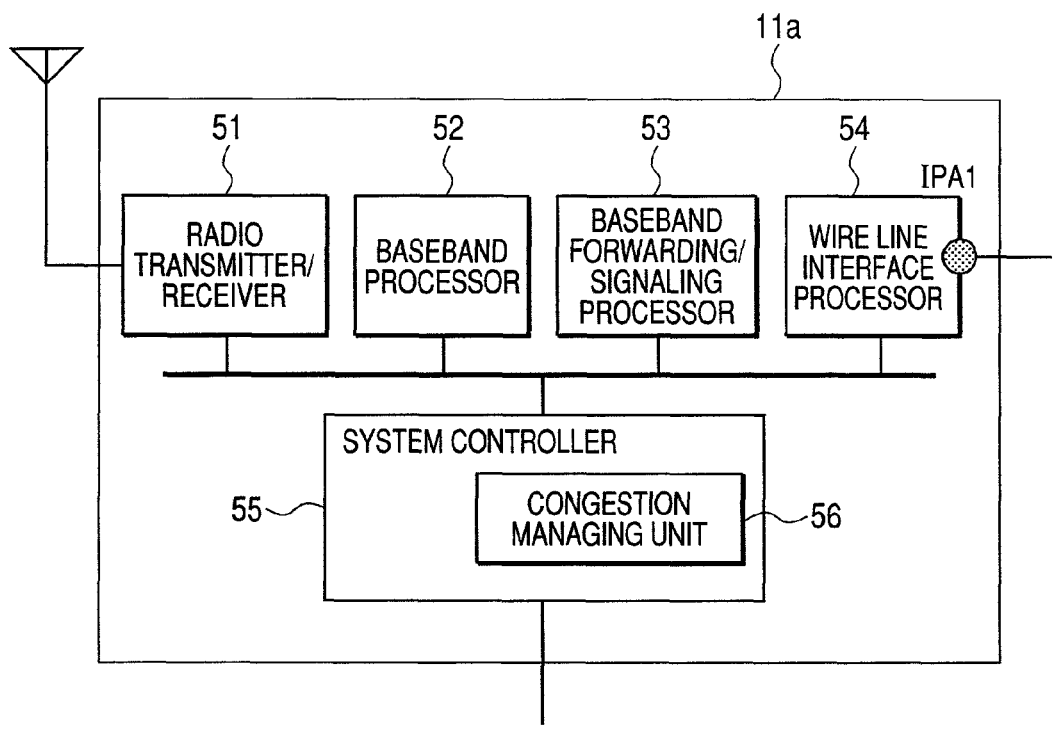

| 1001 | 1002 | 1000 1003 | 1004 | 1005 | 1006 |
|---|---|---|---|---|---|
| ACCESS NAME | USER ADDRESS | A10PCF ADDRESS | A10Key | PDSN ADDRESS | RESTRICTION ADDRESS |
| u1@pdsn.mc1.com | IPA_u1 | IPA3 | KEY2 | IPA4 | IPA1 |

| 1200 | 1201 | 1202 | 1203 | 1204 | 1205 | 1206 |
|---|---|---|---|---|---|---|
| URI | USER ADDRESS | RESTRICTION STATE | PERMANENT PRIORITY | PRIORITY CALLED-PARTY | PRIORITY CALLING-PARTY |
| u1@ss.mc1.com | IPA_u1 | RESTRICTION | INVALID | u2@ss.mc2.com<br>119@fdma.go.jp | u2@ss.mc2.com<br>119@fdma.go.jp |

| | 1300 |
|---|---|
| 1301 | RESTRICTION REQUEST |
| 1302 | IPA1 |
| 1303 | IPA1 |
| 1304 | IPA2 |
| 1305 | KEY1 |

| URI | ALTERNATIVE URI |
|---|---|
| u2@ss.mc2.com | u2@ss.fc.com |

COMMUNICATION SYSTEM AND CALL CONTROL SERVER

CLAIM OF PRIORITY

The present application claims priority from Japanese application JP No. 2006-001993 filed on Jan. 10, 2006, the content of which is hereby incorporated by reference into this application.

FIELD OF THE INVENTION

The invention relates to communication control when there is congestion in a radio IP network.

BACKGROUND OF THE INVENTION

An example of a congestion control method when the radio base station of a mobile communication system is congested, is the method disclosed in JP-A-No. 6-105360. According to this, a base station control device detects congestion of a radio base station, and transmits a congestion notification signal to a remote maintenance device. The remote maintenance device transmits a restriction information signal to a base station control device considering the strengthening/mitigation of the restriction level. The restriction information signal contains an identification code of the radio base station which is the restriction target, eight restriction patterns of one octet which, when mobile terminals are divided into groups, express whether or not each group is a restriction target by one bit respectively, and a change cycle which indicates the application time of one restriction pattern. The base station control device, when the restriction information signal is received, transmits one restriction pattern to the radio base station during congestion. Based on the change cycle, the remaining seven restriction patterns are transmitted one by one, and the terminal group of the restriction target is changed over. The radio base station, when a restriction pattern is received, restricts the registration messages and call connections received from a specific terminal group by reporting which terminal group is under restriction to the mobile terminals under it.

When a terminal transmits a call control message (a registration message/call setup message) to the radio base station, the radio base station can interpret these layer 3 messages, and restrict transmission of new calls alone. Likewise, when a mobile switching center and the base station control device transmit a call control message, the radio base station can interpret layer 3 messages, and restrict incoming calls receipt.

An example of a receive restriction on incoming calls method when the radio base station is congested is the method disclosed in JP-A No. 10-336321. According to this, a maintenance operator supervises congestion of the base station by measuring, at a mobile switching center, the number of call setup connection failure messages transmitted to the mobile switching center when the radio base station fails to make a call connection due to the fact that all channels of the base station are in use. If the maintenance operator determines that a receive restriction on incoming calls for the base station is required, the identification number of the restriction target base station and restriction rate are registered in a restriction registration table of the mobile switching center with a maintenance command. When the mobile switching center receives an incoming call, the base station which accommodates a called receiving partner mobile station is specified by looking up a terminal location position management database, and it is determined whether the base station is a restriction target on the restriction registration table is referred to before paging the mobile station making a call.

If the base station is the restriction target, the mobile switching center cancels stops the call according to the restriction rate.

SUMMARY OF THE INVENTION

When making a call over via the cellular IP network of a cellular phone, an SIP server in the core network performs the functions of the prior art mobile switching center. The SIP server exchanges messages directly with a SIP client which is a terminal, and controls call setup connection and call release. Specifically, the source sender IP address and destination IP address of the SIP message are an SIP client or an SIP server. Here, there are two problems.

The first problem is that the SIP server, when it communicates with the SIP client, does not know which communication node in the radio access network (RAN) is on the route between the two to use. For this reason, when the SIP server attempts call setup to receive a message in the SIP client, it cannot determine whether congested nodes would more suffer from traffic load of the call and should restrict the call the base station which accommodates the SIP client cannot be specified. Therefore, when attempting to perform a receive restriction, it cannot be determined whether or not the incoming call is a restriction target.

The second problem is that the RAN forwards the SIP message between server and client as a simple IP packet, and it is not recognized as a layer 3 (i.e., call control) message. Therefore, if a terminal transmits an IP packet even if restriction information is reported from a base station suffering congestion to a terminal, once the terminal has transmitted an IP packet, the base station cannot distinguish it from an IP packet containing speech information of an existing call, and hence cannot discard it. Likewise, even when the IP packet which contains the call setup message from the SIP server is received, the packet cannot be discarded selectively and a call setup connection failure cannot be clearly notified to the message sender.

Also, the SIP server or SIP client which is the message sender of the SIP message will resend the message multiple times, if a response to the outgoing message cannot be received. As a result, even if the call passes via a congested node which cannot maintain sufficient voice quality, the call connection may nevertheless be made. This will further worsen the congestion state and will also reduce the quality of existing calls.

As mentioned above in addition, there is the following problem in congestion control for when a calls over is made via the cellular IP network of a cellular phone. When congestion occurs, in order to mitigate congestion without lowering the quality of existing calls, it is required to detect a call which is routed onuses a congested node and perform restriction selectively in call units, but the SIP server cannot perform the former and the RAN cannot perform the latter. This problem did not occur in a prior art circuit switched network where the mobile switching center was always aware of which communication node in the RAN was used for connection of a terminal, and where the communication nodes in the RAN interpreted a call control connection request message.

It is therefore a main object of the invention to permit a RAN to specify the IP address of a terminal which communicates overusing a congested node, and permit an SIP server to identify a terminal having this IP address as a restriction target.

In a communication restriction system of present invention, when congestion occurs, a SIP server can recognize a call which uses a congested node and perform restriction in call selectively units, so congestion of nodes in the RAN can be mitigated without reducing the quality of existing calls.

BRIEF DESCRIPTION OF THE DRAWINGS

FIG. 5 is a composition diagram of a base station;

FIG. 6 is a diagram of a connection table managed by a base station;

DETAILED DESCRIPTION OF THE PREFERRED EMBODIMENTS

Figure 1:
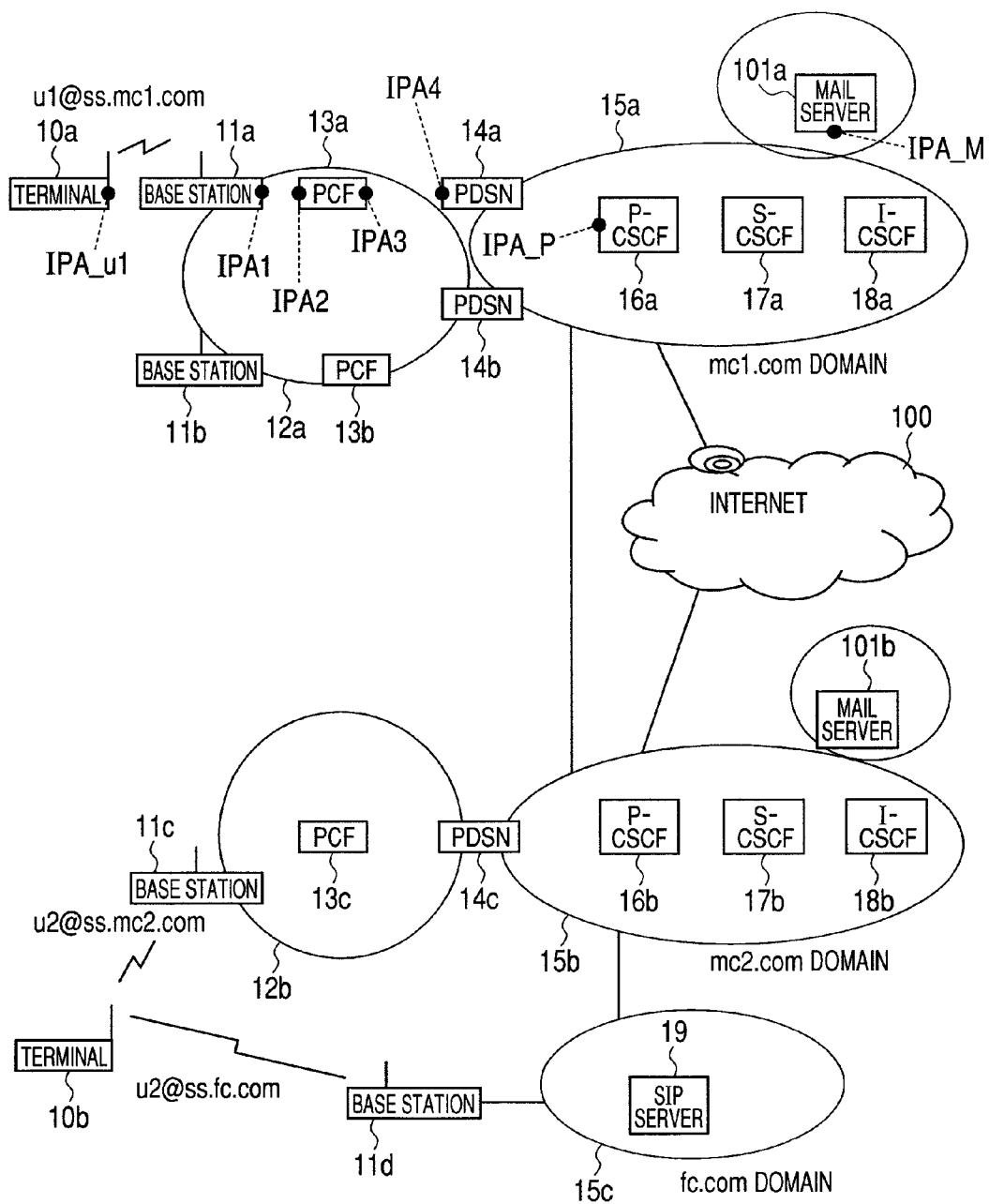
FIG. 1 is a general drawing of a communication network which applies the invention.

FIG. 1 is a general diagram of a communication network applying the invention. A terminal 10a is a cell phone unit, and it is assigned the IP address IPA_u1. The terminal 10a performs voice communication by VoIP (Voice over IP) using this address. The SIP URI used at this time is u1@ss.mc1.com. Base stations 11a, b, c are radio base stations which perform radio communication with the terminal 10a. The base station 11a is assigned IPA1 as an IP address. PCF 13a, b, c are Packet Control functions, which perform adjustment of packet length suitable for the terminal-base station radio link, and buffering of packets addressed to the terminal transmitted from a PDSN 14a, b, c before the radio link is established. The PCF 13a is assigned IPA2, IPA3 as IP addresses. IPA2 is for communication with the base station 11a, and IPA3 is for communication with the PDSN 14a. The PDSN 14a, b, c are Packet Data Serving Nodes, and terminate The PPP from the terminal. The PDSN 14a is assigned IPA4 as an IP address, and communicates with the PCF 13a by this address.

The network formed by the base station and the PCF is referred to as a RAN (Radio Access Network: radio access network). The base station 11a, b, the PCF 13a, b belong to a RAN 12a. Likewise, the base station 11c and the PCF 13c belong to a RAN 12b. Core networks 15a, b are cellular phone business operator core networks. The core network 15a is a mc1.com domain, and is a home domain of terminal 10a. The core network 15a connects with the RAN 12a via the PDSN 14a, b. The core network 15b is a mc2.com domain, and connects with the RAN 12b via the PDSN 14c.

A P-CSCF 16a, b, S-CSCF 17a, b, I-CSCF 18a, b are SIP servers which perform call control. The P-CSCF 16a, b are Proxy-Call Session Control Functions, which communicate with terminals by SIP messages directly and the terminal is a SIP server which is a direct partner transmitting and receiving SIP messages. For example, when the terminal 10a is located under the RAN 12a, the partner which transmits and receives SIP messages is the P-CSCF 16a. The P-CSCF 16a is assigned IPA_P as an IP address. Therefore, the destination IP address of the packet of the SIP message which the terminal 10a transmits is IPA_P. If the terminal 10a moves under the RAN 12b, the partner which transmits and receives SIP messages will be the P-CSCF 16b. The terminal 10a uses DNS, for example, to resolve request the IP address of the P-CSCF which manage the area the terminal 10a located according to the travel position. The S-CSCF 17a, b are Serving-Call Session Control Functions, and are SIP servers which determine execution of services such as voice call based on subscriber information of the terminal. If a terminal transmits an SIP message to the P-CSCF, the P-CSCF will forward the SIP message to the S-CSCF of the home domain of the terminal. Therefore, if the terminal 10a transmits an SIP message to the P-CSCF 16a from under the RAN 12a, the P-CSCF 16a will be forwarded to the S-CSCF 17a. When the terminal 10a moves to the RAN 12b, the SIP message transmitted by the terminal 10a is forwarded to the S-CSCF 17a via the P-CSCF 16b. I-CSCF 18a, b are Interrogating-Call Session Control Functions, and have a function to search the S-CSCF which is responsible for call control of the target terminal within the home domain. A mail server 101a is the mail server of domain mc1.com. IPA_M is assigned as an IP address. 101b is the mail server of mc2.com. In the case of the terminal 10a, exchange of e-mail control signals with the mail server 101a is performed via the P-CSCF and the S-CSCF 17a. The Internet 100 is connected to the core networks 15a, b, and the terminals also have Internet access. The terminal 10a, RAN 12a, b, and the core networks 15a, b, are based for example on the 3GPP2 specification. A core network 15c is a fixed-line telephone company core network, and is a fc.com domain. The base station 11d is a wireless LAN base station, and communicates with the terminal 10b. The terminal 10b is assigned u2@ss.fc.com as the SIP URI, and a fixed-line telephone service can be received using this. In this case, the SIP server 19 performs call control. The terminal 10b also makes a contract with the cellular phone operator of the mc2.com domain.

The terminal 10b can be assigned u2@ss.mc2.com, and a cell phone service can be received using this. In this case, the terminal 10b transmits an SIP message to the P-CSCF 16b via the base station 11c, the PCF 13c, and the PDSN 14c.

Figure 2:
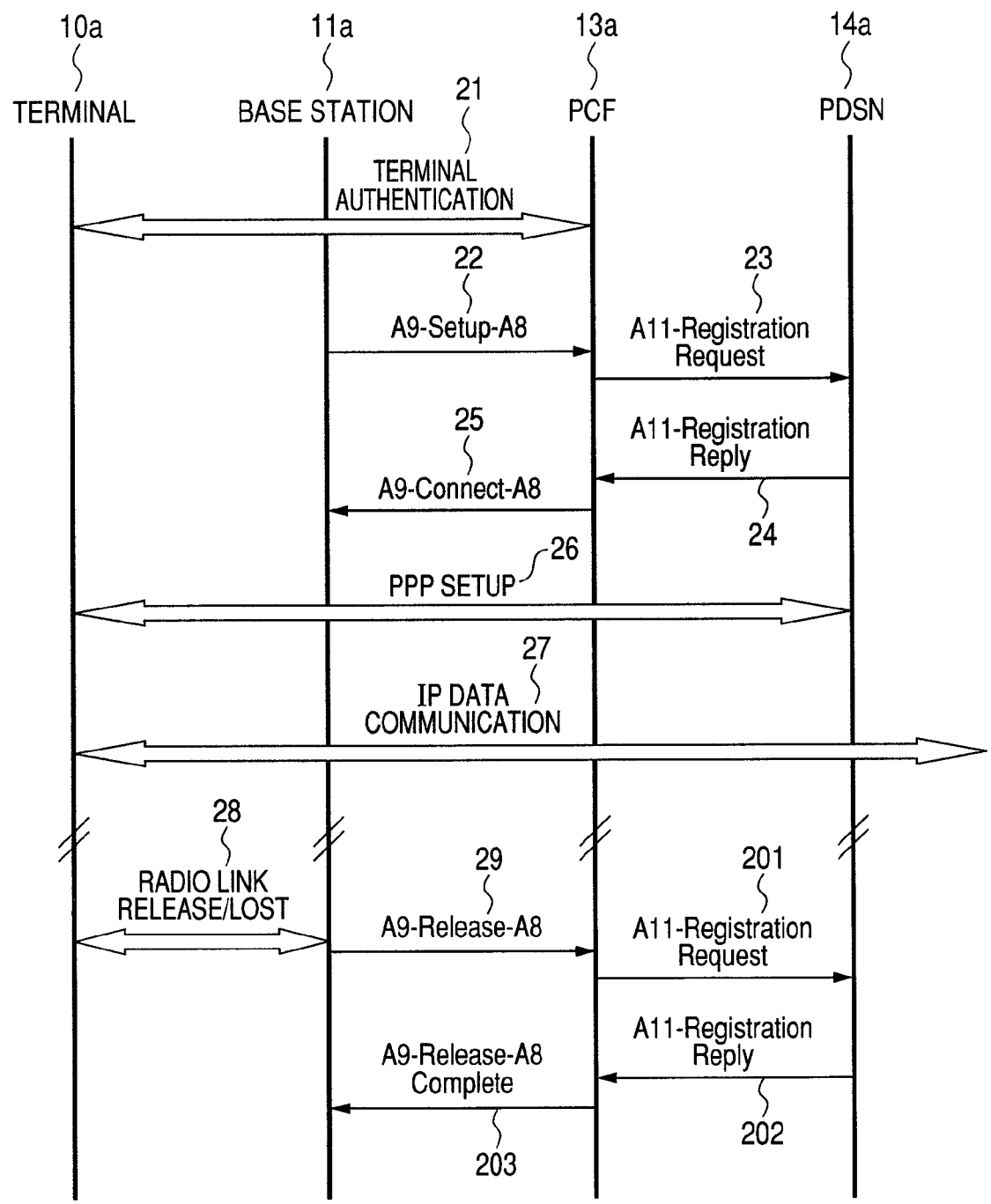
FIG. 2 is a terminal network access connection/release sequence.
Figure 3:
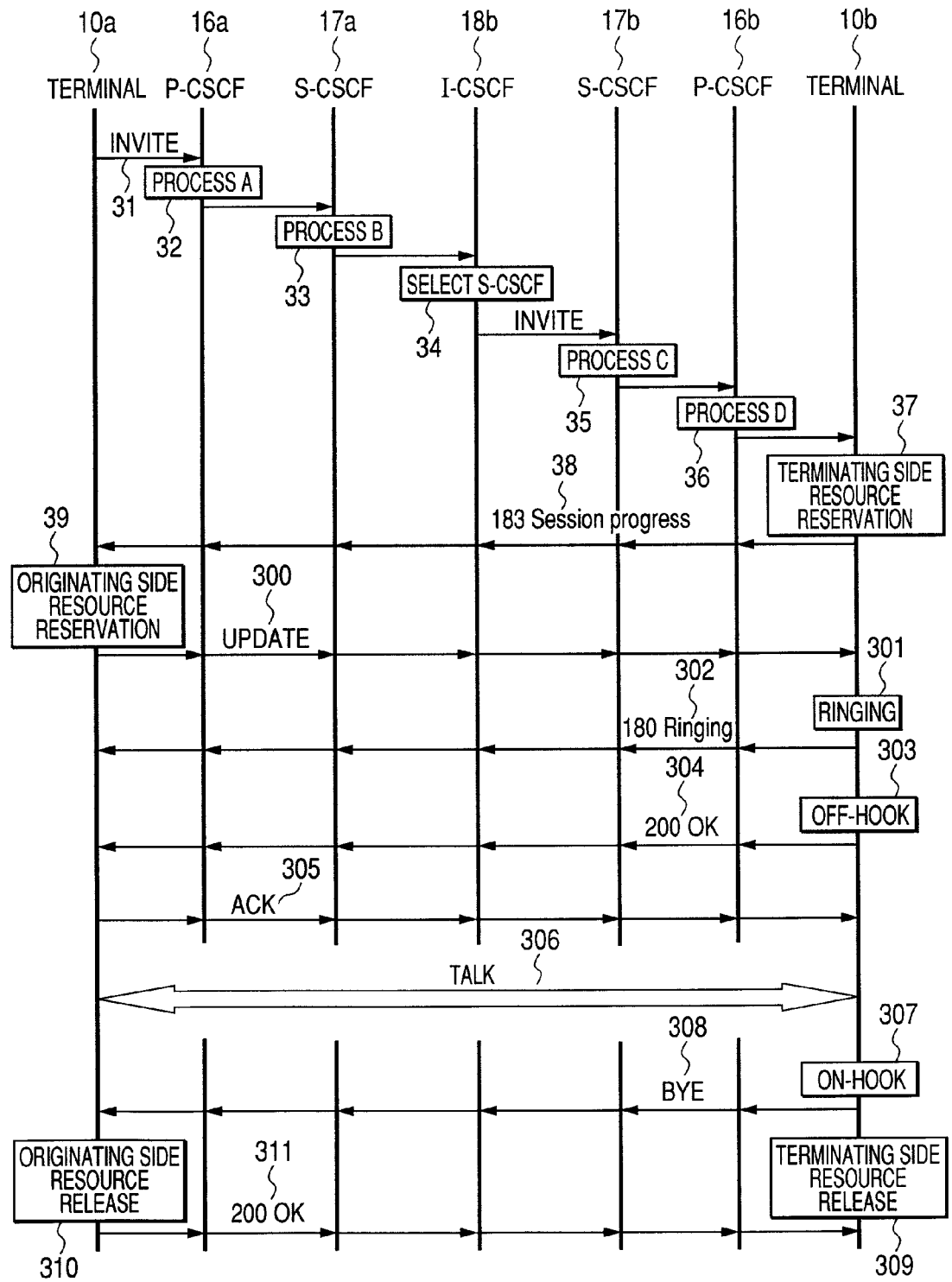
FIG. 3 is a terminal call setup connection/call release sequence.

Next, the flow of operations when the terminal 10a connects with the network and makes a call connection will be described using FIGS. 2, 3. FIG. 2 shows the sequence until the terminal 10a makes a network connection (until it can perform IP communication) after power is switched ON under the base station 11a), and the sequence when the network connection is released terminated. This procedure is prior art. The terminal 10a performs a terminal authentication procedure with the PCF 13a via the base station 11a (Step 21). The base station 11a then transmits an A9-Setup-A8 message to the PCF 13a (Step 22). This message is a message for establishing the connection between the base station 11a and the PCF 13a (referred to as an A8 connection). The PCF 13a transmits an A11-Registration-Request message to the PDSN 14a (Step 23). This message is a message for establishing the connection between the PCF 13a and the PDSN 14a (referred to as an A10 connection). The PDSN 14a transmits an A11-Registration Reply message to the PCF 13a, and establishes an A10 connection (Step 24). The PCF 13a transmits an A9-Connect-A8 message to the base station 11a, and establishes an A8 connection (Step 25). Hence, the terminal 10a can now communicate with the PDSN 14a. The terminal 10a performs PPP negotiation with the PDSN 14a (Step 26). A PPP link is established and the terminal 10a can now perform IP data communication (Step 27).

Figure 19:
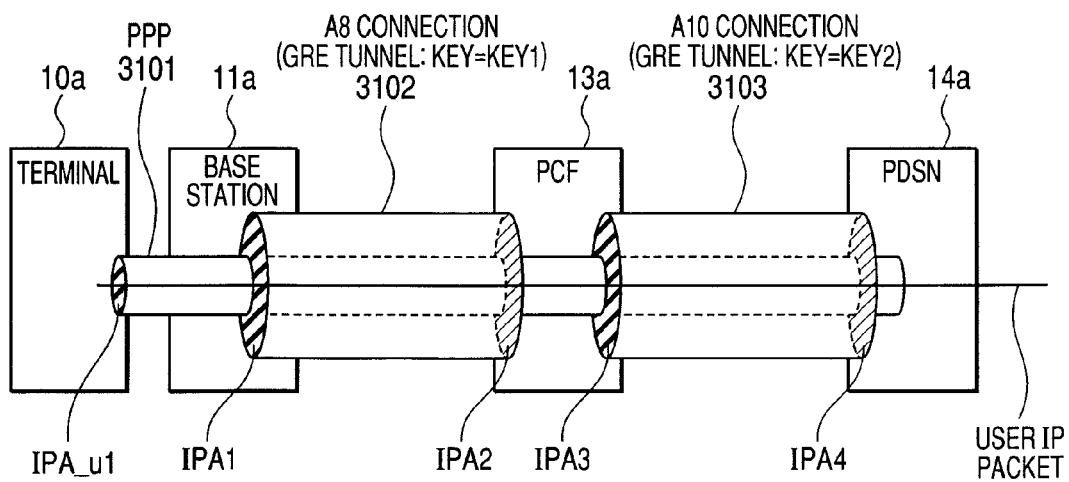
FIG. 19 is a conceptual diagram of the communication channel from a terminal to the PDSN.

FIG. 19 shows a schematic diagram of the communication path from the terminal 10a to the PDSN 14a. A PPP 3101 is established extends between the terminal 10a and the PDSN 14a. The IP address of the endpoint of PPP 3101 on the side of the terminal 10a is IPA_u1. An A8 connection 3102 is established between the base station 11a and the PCF 13a. An actual state of the A8 connection is a GRE (Generic Routing Encapsulation) tunnel, and is uniquely identified by the IP addresses (IPA1, IPA2) at both ends and a GRE key (KEY1). GRE is an encapsulation technique for transmitting an arbitrary protocol packet on another arbitrary protocol. An actual state of the A10 connection 3103 is also a GRE tunnel, and is uniquely identified by the IP addresses (IPA3, IPA4) at both ends, and a GRE key (KEY2). The IP packet transmitted by the terminal 10a is first converted to a PPP frame by the terminal 10a, and is transmitted to the base station 11a. The base station 11a identifies the terminal by a MAC INDEX which is a terminal identifier defined by the 3GPP2 radio protocol between wireless sections, and specifies a correlated corresponding A8 connection. By performing the GRE encapsulation of this PPP frame, it is converted to an IP packet having the source sender IP address=IPA1 and destination IP address=IPA2, and transmitted to the PCF 13a. The PCF 13a identifies the A8 connection by looking up the source sender IP address, destination IP address and GRE key of the received packet, and specifies the correlated corresponding A10 connection. After PPP frame extraction, by performing GRE encapsulation again, it is converted to an IP packet having the source sender IP address=IPA3 and destination IP address=IPA4, and transmitted to the PDSN 14a. The PDSN 14a performs GRE decapsulation and PPP frame decomposition, and extracts the internal IP packet, i.e., the user packet transmitted by the terminal 10a, and sends it to the core network 15a. Conversely, as regards the packet addressed to IPA_u1 received by the PDSN 14a from the core network 15a, the PDSN 14a identifies that it is addressed to the terminal 10a from the destination address (IPA_u1) of the received packet, and specifies the A10 connection. After PPP frame conversion, GRE encapsulation is performed and it is transmitted to the PCF 13a. The PCF 13a identifies the A10 connection from the source sender IP address, destination IP address and GRE key of the received packet, and specifies the correlated corresponding A8 connection. After decapsulation of the received packet, GRE encapsulation is performed again and it is transmitted to the base station 11a. The base station 11a identifies the A8 connection of the received packet, and transmits the PPP frame after GRE decapsulation to the terminal 10a by a radio frame with the correlated corresponding MAC INDEX.

Figure 7:
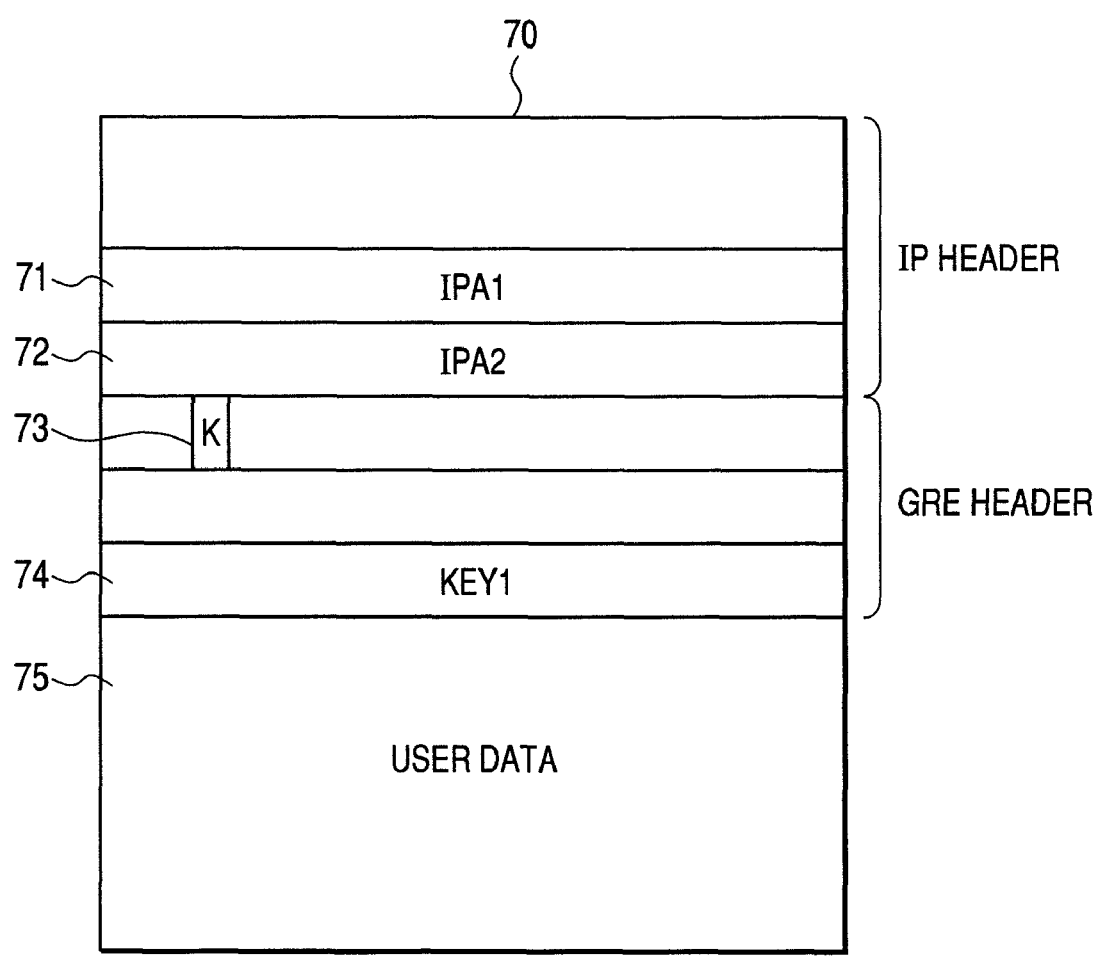
FIG. 7 is an A8 packet format.

FIG. 7 shows the packet format on the A8 connection which the base station 11a transmits to the PCF 13a. IPA1 is set to a source sender IP address 71 of an A8 packet 70. IPA2 is set to a destination IP address 72. K73 is a flag which shows that the GRE header contains a GRE key 74, and is set to "1." KEY1 assigned to the A8 connection for the terminal 10a is set to the GRE key 74. A user data 75 stores the PPP frame transmitted by the terminal 10a. The A10 packet also has the same format, only the value of the source sender IP address 71, destination IP address 72, and GRE key 74 being different.

Returning now to FIG. 2, when the terminal 10a switches OFF or communication with the base station 11a is no longer possible, the base station 11a transmits a A9-Release-A8 message to the PCF 13a (Step 29) after for radio link is released (Step 28). This message requests release of the A8 connection. The PCF 13a transmits an A11-Registration Request message to the PDSN 14a (Step 201). This message includes a parameter which signifies a release request, and requests release of the A10 connection. The PDSN 14a transmits an A11-Registration Reply message to the PCF 13a (Step 202). This releases the A10 connection. The PCF 13a transmits an A9-Release-A8 Complete message to the base station 11a (Step 203). This releases the A8 connection.

Next, FIG. 3 will be described. FIG. 3 is the state (state of Step 27 of FIG. 2) in which IP data communication with the terminal 10a can be performed, and is a call setup connection and call release sequence. In the diagram, a processing A32, processing B33, processing C35, and processing D36 are new processes added by the invention, the remaining processes being prior art. Here, the prior art will be described, and the processing A32, processing B33, processing C35, and processing D36 will be described later.

The terminal 10a first transmits INVITE, which is an SIP message signifying a call setup send request, to the P-CSCF 16a (Step 31). The INVITE message contains the SIP URI (u1@ss.mc1.com) of the terminal 10a, and the SIP URI (u2@ss.mc2.com) of the terminal 10b of the called party receiving partner. The P-CSCF 16a forwards the message to the S-CSCF 17a of the home domain of the terminal 10a. The S-CSCF 17a forwards the message to I-CSCF 18b of the home domain of the terminal 10b, which is the called party receiving partner. From the SIP URI of the terminal 10b, I-CSCF 18b specifies the S-CSCF 17b which is responsible for call control of the terminal 10b (Step 34), and forwards the INVITE message. The S-CSCF 17*b* adds the IP address of the terminal 10*b* to the INVITE message, and forwards the message to the P-CSCF 16*b* of the mobile destination. The P-CSCF 16*b* transmits the message to the terminal 10*b*.

The terminal 10*b*, after reserving securing various resources required for the telephone call, transmits a 183 Session progress message to the terminal 10*a* (Step 37, 38). The terminal 10*a* reserves secures resources (Step 39), and transmits an UPDATE message to the terminal 10*b* (Step 300) The terminal 10*b* starts a user call (ringing) (Step 301). A 180 Ringing message is then transmitted to the terminal 10*a* (Step 302). When the user of the terminal 10*b* is off-hook (Step 303), the terminal 10*b* transmits a 200 OK message to the terminal 10*a* (Step 304). As the response to the 200 OK message, the terminal 10*a* transmits an ACK message (Step 305). In this way, a telephone call can be made (Step 306).

Figure 25:
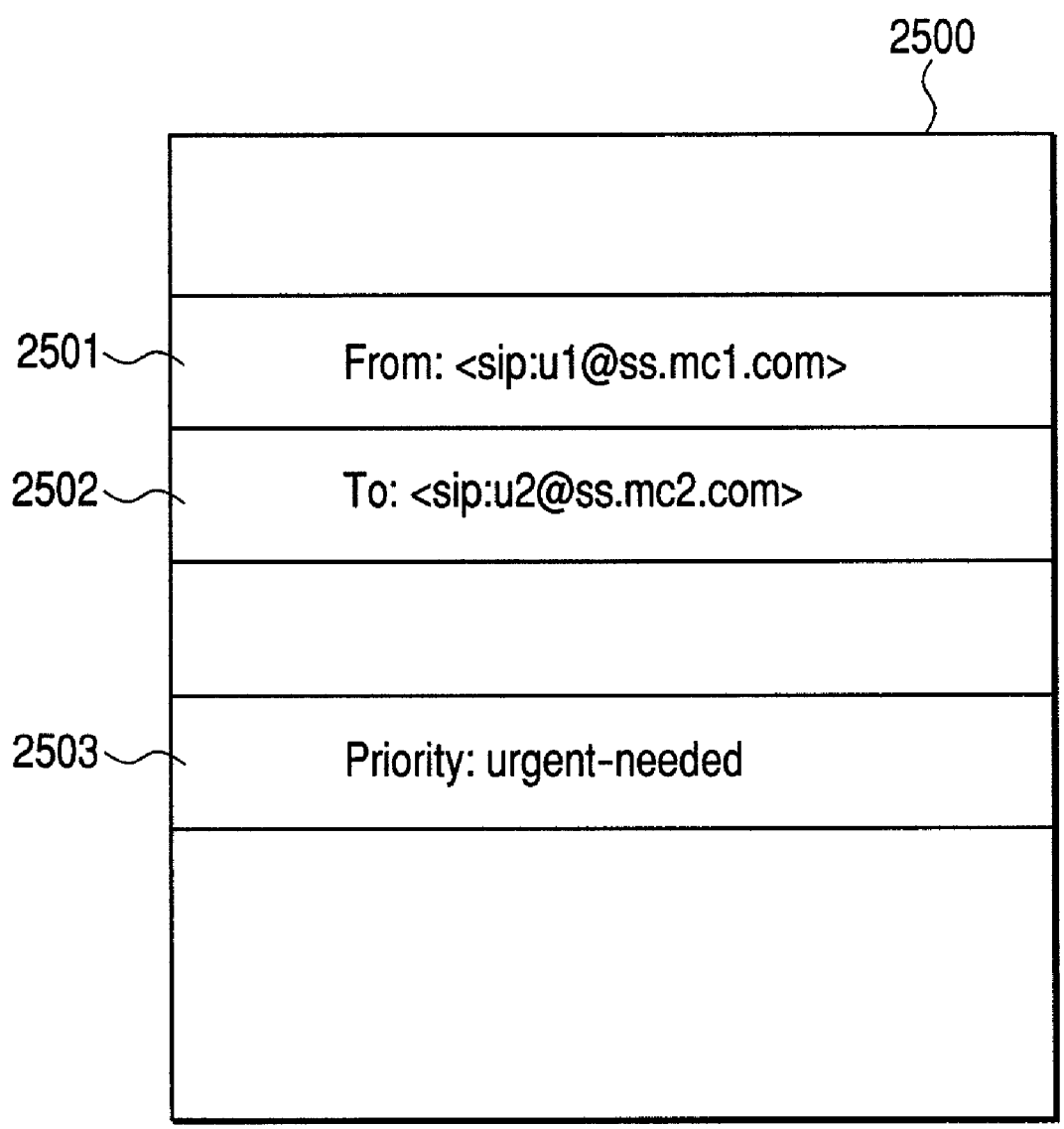
FIG. 25 is a format diagram of an INVITE message.

FIG. 25 shows the format of the INVITE message. A From header 2501 is the SIP URI of the calling party sending terminal. A To header is the SIP URI of the called party receiving terminal. A Priority header 2503 is a header which shows the call priority. The Priority header 2503 is generally intended to notify the called receiving terminal user, and it is not used for call control in the network. However, in the invention, it is used to store restriction control information used by the processing A32, processing B33, processing C35, and processing D36. Instead of the Priority header, a new header may be defined, and the information stored therein. The use of the Priority header 2503 in the invention will be described later.

Returning now to FIG. 3, assume that the terminal 10*b* has gone on hook when the call finished (Step 307). The terminal 10*b* transmits a BYE message to the terminal 10*a* (Step 308), and releases resources (Step 309).

Likewise, the Terminal 10*a* releases resources (Step 310), and transmits a 200 OK which is a response message (Step 311).

Next, the composition of each device will be described. FIG. 5 is a schematic diagram of the base station 11*a*. A radio transceiver/receiver unit 51 performs modulation/demodulation for transmitting and receiving radio waves to and from the terminal 10*a*. A baseband processing unit 52 extracts a logical messages and packets from the baseband signal from the radio transceiver/receiver unit 51. A packet forwarding/signaling processor 53 performs signaling processing based on the logical message, and GRE encapsulation/of PPP frames, and decapsulation based on the details of the logic message. A wire line interface processor cable circuit switchbox 54 controls the physical layers and MAC layers of the wire line interface the cable circuit. IPA1 is assigned as an IP address to the wire line circuit accommodated by the wire line interface processor cable circuit switchbox 54. A system controller 55 manages the whole base station 11*a*. The system controller 55 has an auto-congestion managing unit 56, and stores its own congestion state.

FIG. 6 shows a connection table managed by the packet forwarding/signaling processor 53, and the system controller 55. A MAC_INDEX61 is a terminal identifier uniquely assigned to the terminal linked to the base station 11*a*. A base station address 62, A8 Key 63, and A8 PCF address 64 are A8 connection information for each terminal. In this example, the MAC_INDEX of the terminal 10*a* is MAC1, which shows that the A8 connections used by the terminal 10*a* are the base station address IPA1, GRE key=KEY1, and the PCF address=IPA2. When the radio packet received by the base station 11*a* from the terminal 10*a* containing a PPP frame, contains MAC1 as the MAC_INDEX, the packet forwarding/signaling processor 53 assembles the A8 packet 70 of FIG. 7 by looking up a connection table 60.

Figures 8, 9:
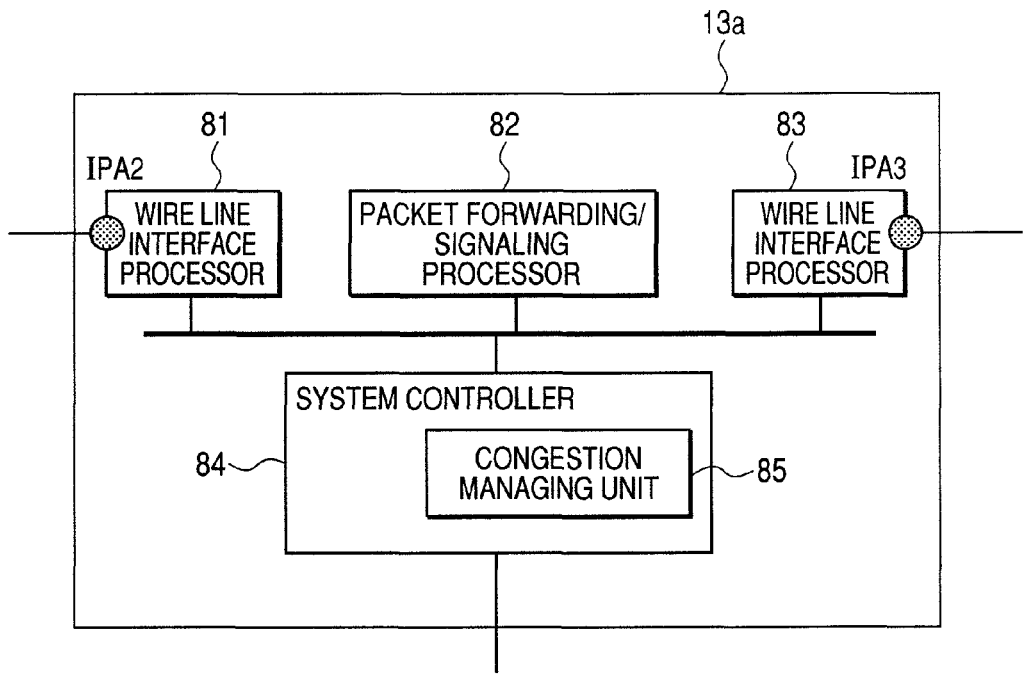
FIG. 8 is a schematic diagram of a PCF.
FIG. 9 is a descriptive diagram of a connection table managed by the PCF.

FIG. 8 is a schematic diagram of the PCF 13*a*. The wire line interface processor cable circuit switchboxes 81, 83 control the physical layer and the MAC layer of the wire line interface cable circuit. IPA2 is assigned as an IP address to the wire line circuit accommodated by the wire line interface processor cable circuit switchbox 81, and IPA3 is assigned as an IP address to the wire line circuit accommodated by the wire line interface processor cable circuit switchbox 83. The packet forwarding/signaling processor 82 performs signaling processing based on the logical messages, and GRE decapsulation and encapsulation, of the A8 packet and A10 packet based on the details of the logic message. The A8 packet from the base station 11*a* is received by the wire line interface processor cable circuit switchbox 81. It is reassembled into an A10 packet by the packet forwarding/signaling processor, and is transmitted to the PDSN 14*a* from the wire line interface processor cable circuit switchbox 83. A system controller 84 manages the whole PCF 13*a*. The system controller 84 has an auto-congestion managing unit 85, and stores its own congestion state.

FIG. 9 shows a connection table managed by the packet forwarding/signaling processor 82, and the system controller 84. The base station address 91, A8 Key 92, and A8 PCF address 93 are A8 connection information. The A10 PCF address 94, A10 Key 95, and the PDSN address 96 are A10 connection information. In this example, when the A8 packet 70 of FIG. 7 is received from the base station 11*a*, an A10 packet having the source sender IP address=IPA3, destination IP address=IPA4, and GRE key=KEY2 is assembled, and transmitted to the PDSN 14*a*.

The composition of the PDSN 14*a* is identical to that of the PCF 13*a* (however in FIG. 8, the IP address is different) IP packets are transmitted and received by the wire line interface processor cable circuit switchbox 81 and the cable circuit switchbox 83, the IP packets being assembled by the packet forwarding/signaling unit 82.

Figures 10, 11:
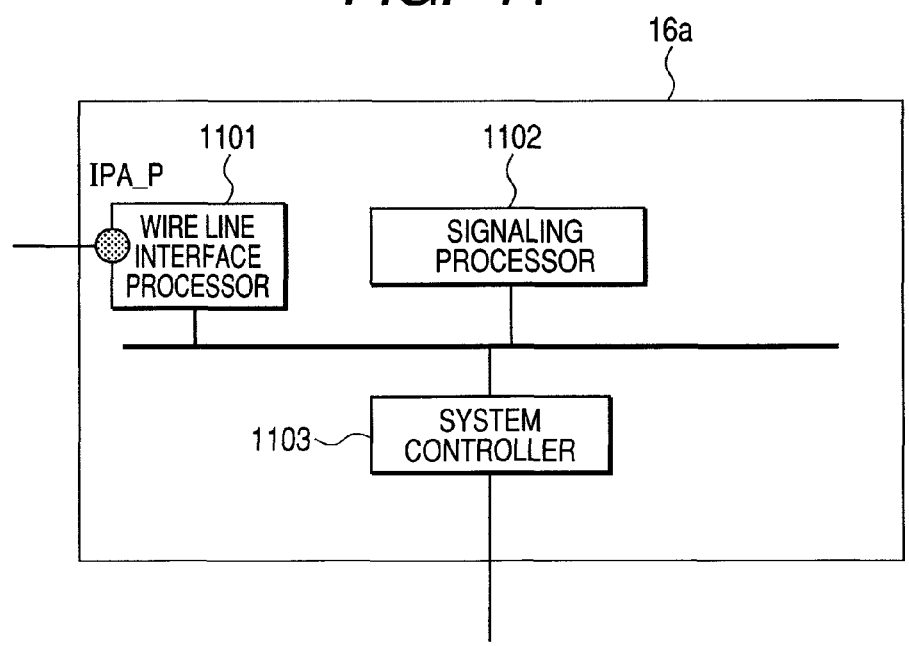
FIG. 10 is a diagram of a connection table managed by a PDSN.
FIG. 11 is a schematic diagram of a P-CSCF.

FIG. 10 shows the connection table managed by the packet forwarding/signaling processor 82, and the system controller 84 of the PDSN 14*a*. An access name 1001 is a user name used when the terminal 10*a* establishes PPP. A user address 1002 is an IP address assigned to the terminal 10*a*. An A10 PCF address 1003, A10 Key 1004, and PDSN address 1005 are A10 connection information. When the PDSN 14*a* receives the IP packet addressed to the terminal 10*a* from the core network 15*a*, the user address 1002 is first searched by the destination IP address (IPA_u1), and correlated an A10 connection is specified. After the received packet is framed by converted to PPP, the A10 packet (destination IP=address=IPA3, source sender IP=address=IPA4, GRE key=KEY2) is assembled. A restriction address 1006 is new information used by the invention. When the base station 11*a* or the PCF 13*a* is congested, the IP address of the congested device is registered in this field region. This example shows the case where the base station 11*a* is congested.

FIG. 11 is a schematic diagram of the P-CSCF 16*a*. The wire line interface processor cable circuit switchbox 1101 controls the physical layer and MAC layer of the wire line interface cable circuit. IPA_P is assigned as an IP address to the wire line circuit accommodated by the wire line interface processor cable circuit switchbox 1101. A signaling processor 1102 processes the SIP messages from the terminal 10*a* or the S-CSCF, and performs call control. The system controller 1103 manages the whole P-CSCF 16*a*.

The compositions of the S-CSCF 17*a* and I-CSCF 18*a* are identical to that of the P-CSCF 16*a* (however in FIG. 11, the IP address is different).

Figures 12, 13:
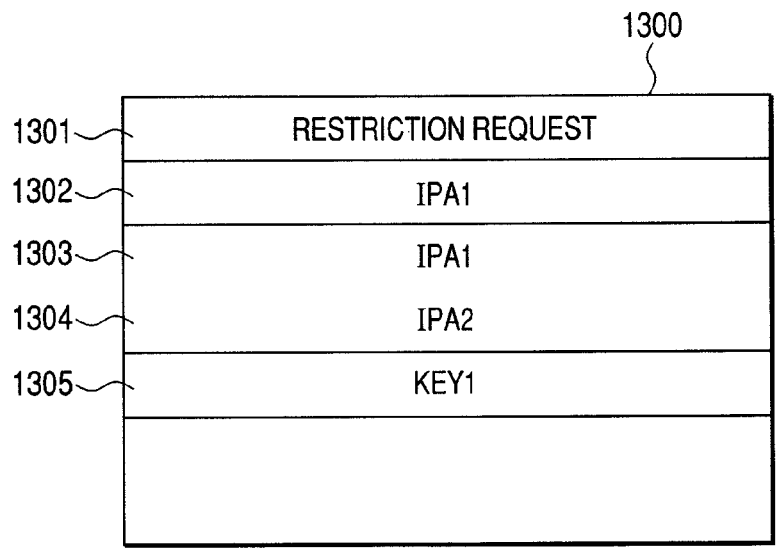
FIG. 12 is a diagram of the user information table managed by the P-CSCF.
FIG. 13 is a format diagram of a restriction request message.

FIG. 12 shows the user information table managed by the signaling processor 1102 of the P-CSCF 16*a* and the S-CSCF 17*a*. URI 1201 is the SIP URI of the terminal 10*a*. The user address 1202 is the IP address currently assigned to the terminal 10*a*. The following is new information used by this invention. First, a restriction state 1203 shows whether or not the base station 11*a* or the PCF 13*a* used by the A8 connection and A10 connection of the terminal 10*a* is congested, and if it is congested, "restriction" is stored. A permanent priority 1204 shows whether or not an incoming/outgoing call of the terminal 10*a* is unconditionally treated as a priority call, and if it is not so treated, "invalid ineffective" is stored. This information is set up when the user of the terminal 10*a* contracts the cell phone service contract of the terminal 10*a* is established. A priority called-party sending priority partner 1205 and priority calling-party receiving priority partner 1206 are significant for a terminal where the permanent priority is "invalid ineffective". For these terminals, when the restriction state 1203 is "restriction", all incoming/outgoing calls are basically actually restricted. However, outgoing call to a party sending to a partner (e.g., family) registered in the priority called-party sending priority partner 1205 is permitted. Likewise, incoming call receiving from a party partner registered in the priority calling-party priority partner 1206 is permitted. In this diagram, the registration details of the priority called-party sending priority partner 1205 coincide with the registration details of the priority calling-party receiving priority partner 1206, but they need not coincide. Also, an special emergency call number can be treated as a priority call by registering a URI for the emergency call special number, such as No. 119, as shown in this diagram. This information is set when the user of the terminal 10*a* contracts the cell phone service contract of the terminal 10*a* is established. It should be noted that, in FIG. 12, the S-CSCF does not use the entry of the restriction state 1203.

Next, the procedure which notifies the IP address of a terminal which should be restricted to the P-CSCF 16*a* when the base station 11*a* or the PCF 13*a* is congested, which is the particular feature of the invention, will be described.

Figure 4:
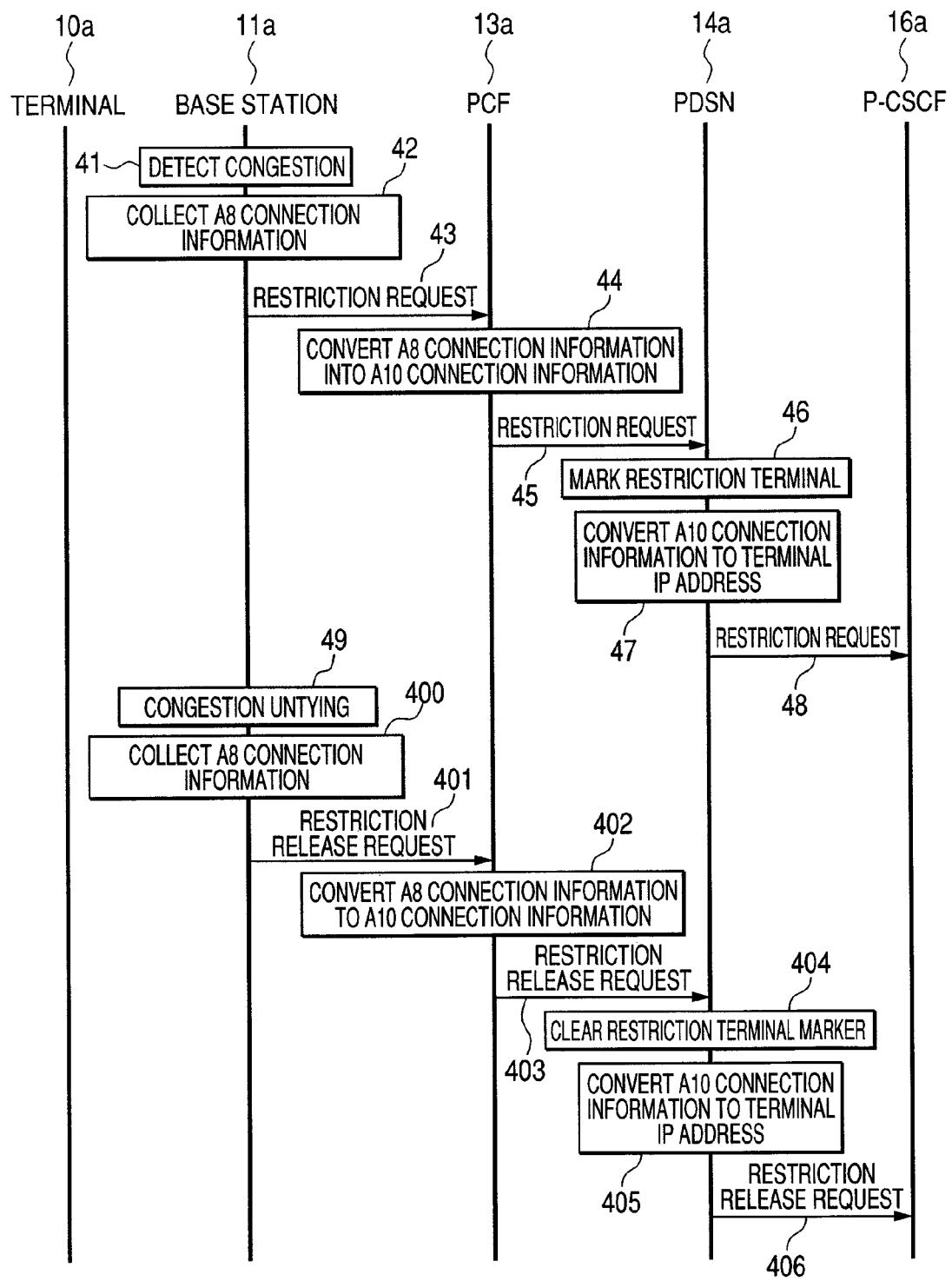
FIG. 4 is a sequence when a base station is congested.

FIG. 4 shows the sequence when the base station 11*a* is congested.

First, in a congestion detection of a Step 41, congestion is deemed to have occurred when, for example, the interference level amount of received radio waves in the radio transceiver/receiver unit 51 of the base station 11*a* is equal to or greater than a predetermined threshold amount. A congestion signal is then sent from the radio transceiver/receiver unit 51 to the system controller 55, and the fact that there is congestion information is stored by the auto-congestion managing unit 56.

The system controller 55 collects all the A8 connection information by looking up the connection table 60 (Step 42). A restriction request message is then transmitted to the PCF 13*a* (Step 43).

FIG. 13 shows the format of the restriction request message. The restriction request 1301 is a message identifier. IPA1 (1302) is the IP address of the base station 11*a* which detected congestion. IPA1 (1303), IPA2 (1304), and KEY1 (1305) are A8 connection information of the terminal 10*a*. If plural terminals are using the base station 11*a*, each A8 connection information is added continuously.

Figure 14:
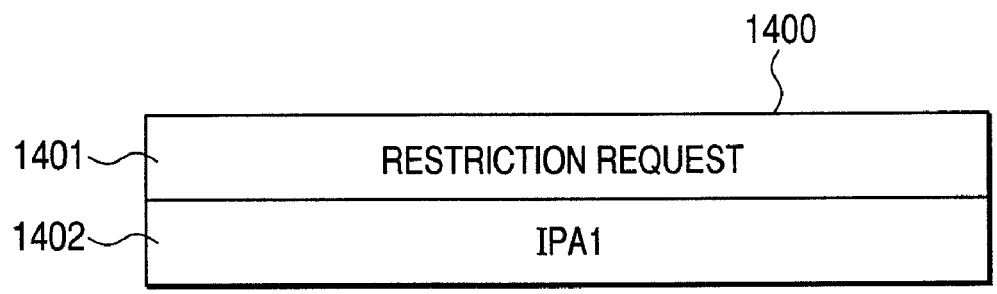
FIG. 14 is a format diagram of the restriction request message when connection information is not quoted.

FIG. 14 shows another format of the restriction request message. In this format, only the IP address (1402) of the base station 11*a* is set instead of adding the A8 connection information for each terminal to the message. The PCF 13*a* which received this message must derive then request the A8 connection which uses the base station 11*a* from the IP address of the base station 11*a*.

The advantage of using the format of FIG. 13 is that, in case A8 connections affected by congestion are not all the A8 connections handled by the base station 11*a*, when the connections related to congestion for reasons of platform configuration, etc., are limited, only the A8 connections affected can be restriction target. The absolute minimum number of connections may be used as the restriction target. On the other hand, the advantage of using the format of FIG. 14 is that the load of the restriction request message creation/transmitting processing performed by the base station 11*a* during congestion can be reduced.

Figure 16:
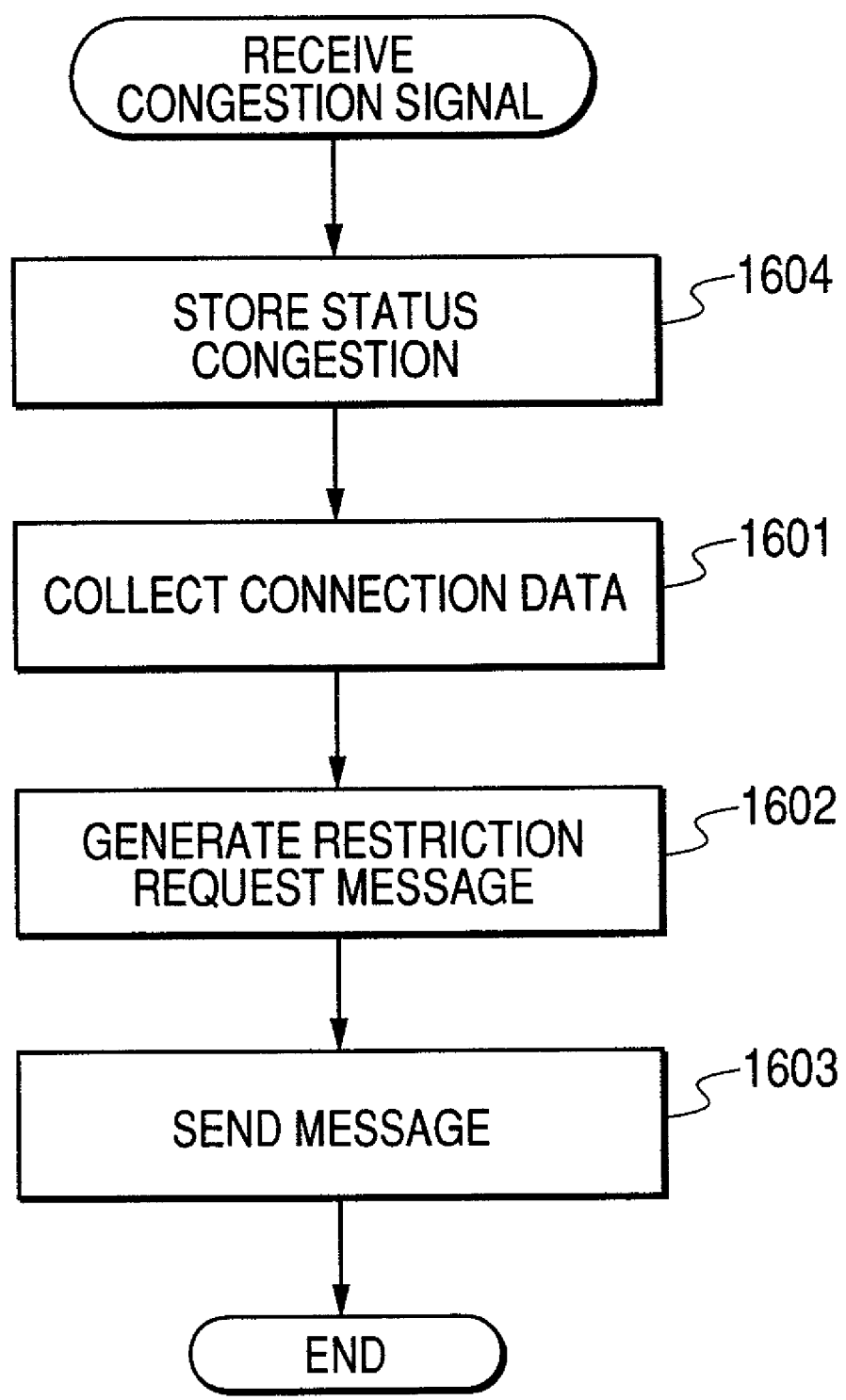
FIG. 16 is a flow chart of the congestion processing of the base station.

FIG. 16 shows the processing flow of the system controller 55 of the base station 11*a*. When a congestion signal is received, congestion information is recorded (Step 1604). Connection information is collected from the connection table 60 (Step 1601), and a restriction request message 1300 or 1400 is created (Step 1602). This is then transmitted to the PCF 13*a* via the packet forwarding/signaling processor 53, and the wire line interface processor cable circuit switchbox 54 (Step 1603).

Returning to FIG. 4, when the PCF 13*a* receives a restriction request (Step 43), the A8 connection information contained in the message is tested by comparison with a connection table 90, and converted into A10 connection information (Step 44). When the format of the received restriction request message is FIG. 14, the connection table 90 is searched for records whose messages for which base station IP address 91 is IPA1 of the connection table 90 matches IPA1 (1402) in the message are extracted, and A10 connection information of those records for these is added in the same format as FIG. 13. For the obtained restriction request message 1300, IPA1 (1303) is IPA3, IPA2 (1304) is IPA4, and KEY1 (1305) is KEY2 (this is the A10 connection information of the terminal 10*a*). The resulting message is sent to the PDSN 14*a* (Step 45).

Figure 18:
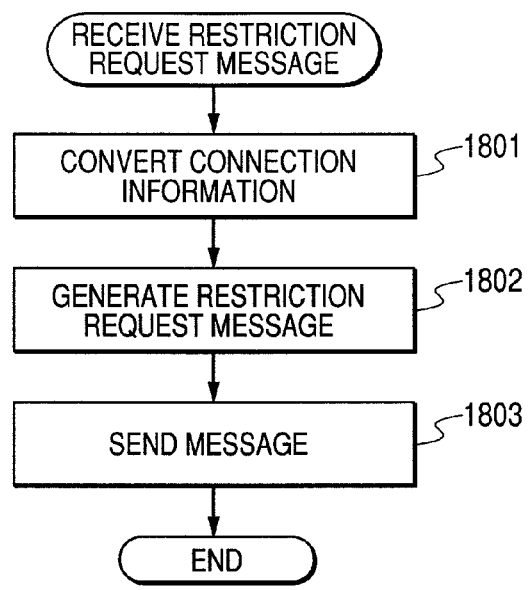
FIG. 18 is a flow chart of a restriction message reception processing of the PCF.

FIG. 18 shows a processing flow of the system controller 84 of the PCF 13*a*. When a restriction request message is received via the wire line interface processor cable circuit switchbox 81 and the packet forwarding/signaling processor 82, A10 connection information is derived requested from the A8 connection information or the base station IP address in the message (Step 1801). The restriction request message is then reconstituted (Step 1802), and transmitted to the PDSN 14*a* via the packet forwarding/signaling processor 82 and the wire line interface processor cable circuit switchbox 83 (Step 1803).

Returning to FIG. 4, when the PDSN 14*a* receives a restriction request message (Step 45), IPA1 (1302) is set as the restriction address 1006 of the correlated corresponding A10 connection in the connection table 1000 (Step 46). The user IP address 1002 is extracted, and a restriction request message 1500 is created (Step 47). This is transmitted to the P-CSCF 16*a* (Step 48).

Figure 20:
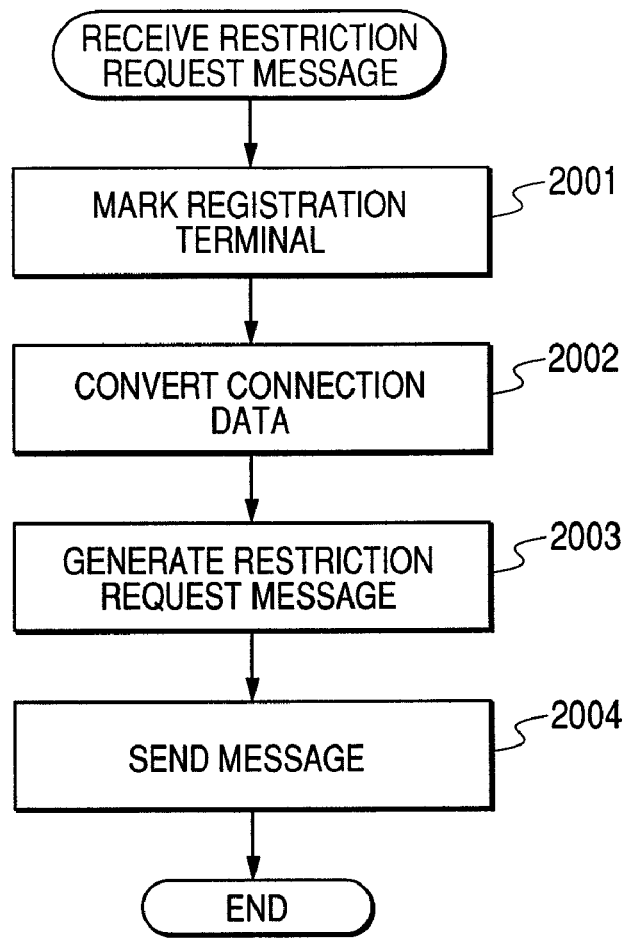
FIG. 20 is a flow chart of a restriction message reception processing of the PDSN.

FIG. 20 shows a processing flow of the system controller 84 of the PDSN 14*a*. When a restriction request message is received via the wire line interface processor cable circuit switchbox 81 and the packet forwarding/signaling processor 82, in the connection table 1000, the IP address which is the source of the congestion is set as the restriction address 1006 of the correlated corresponding connection (Step 2001).

Next, the A10 connection information is converted to correlated terminal IP addresses of the corresponding connections are collected (Step 2002). These are set as the restriction request message 1500 (Step 2003). The obtained message is transmitted to the P-CSCF 16*a* via the packet forwarding/signaling processor 82 and the wire line interface processor cable circuit switchbox 83 (Step 2004).

Figure 21:
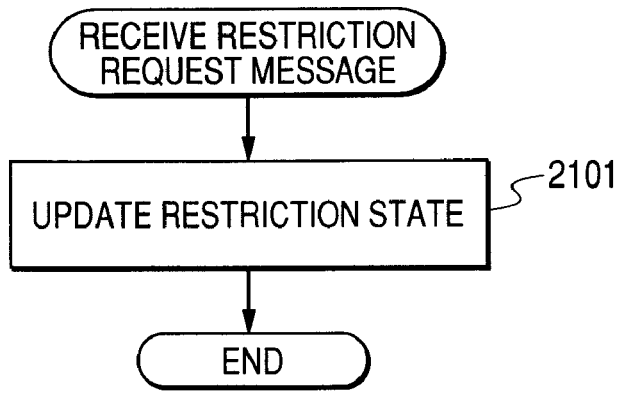
FIG. 21 is a flow diagram of a restriction message reception processing of the P-CSCF.

FIG. 21 shows a processing flow when the signaling processor 1102 of the P-CSCF 16*a* receives the restriction request message 1500. When the message is received via the wire line interface processor cable circuit switchbox 1101, the user address 1202 of a user information table 1200 is looked up. When there is an IP address contained in the restriction request message 1500, the correlated corresponding restriction state 1203 is set to "restriction" (Step 2101).

Returning now to FIG. 4, the above is the processing flow chart when congestion is detected. Next, the processing flow chart when congestion has untied converged will be described. The flow of conversion from connection information to terminal IP address, and notification of the P-CSCF 16*a*, is identical to that of congestion detection.

In performing the detection of congestion untying convergence of Step 49, congestion untying convergence is determined when, for example in the radio transceiver/receiver unit 51 of the base station 11*a*, the interference level amount of the received radio wave is equal to or less than a predetermined threshold constant. A congestion untying convergence signal is then sent from the radio transceiver/receiver unit 51 to the system controller 55, and the congestion information during congestion registered in the auto congestion managing unit 56 is cleared. The system controller 55 collects all the A8 connections by looking up the connection table 60 as in the Step 42 (Step 400). A restriction release request message is then transmitted to the PCF 13*a* (Step 401).

The format of the restriction release request message is substantially identical to that of the restriction request message of FIGS. 13 and 14. A difference is that the restriction requests 1301, 1401 which are message identifiers are values showing the restriction release request.

The processing flow chart of the system controller 55 of the base station 11*a* is substantially identical to that of FIG. 16. Differences are that the processing trigger is not receipt of a congestion signal but receipt of a congestion untying convergence signal, that the Step 1604 is clearance of congestion information during congestion, and that the Step 1602 is restriction release request message generated.

Returning to FIG. 4, when the PCF 13*a* receives a restriction release request (Step 401), as in the Step 44, the A8 connection information in the message is converted to A10 connection information (Step 402). A restriction release request is then transmitted to the PDSN 14*a* (Step 403).

The processing flow chart of the system controller 84 of the PCF 13*a* is identical to that of FIG. 18. Differences are that the processing trigger is receipt of a restriction release request message, and that the Step 1802 is restriction release request message generation.

Figure 15:
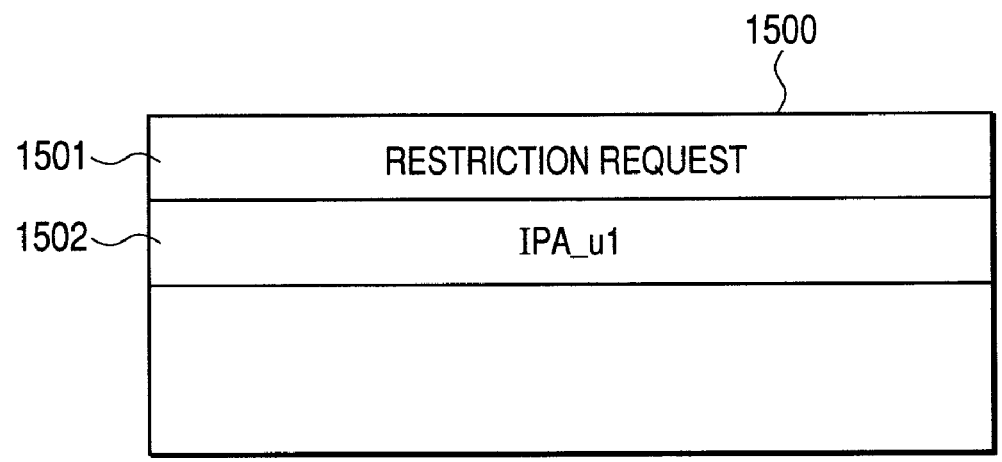
FIG. 15 is a format diagram of the restriction request message transmitted by the PDSN to a P-CSCF.

Returning to FIG. 4, when the PDSN 14*a* receives the restriction release request message (Step 403), the restriction address 1006 of the connection table 1000 set in the Step 46 (Step 404) is cleared. As in the Step 47, the A10 connection information is converted to a terminal IP address (Step 405), and a new restriction release request message is created. The format of this message is identical to that of FIG. 15. A difference is that a restriction request 1501 which is a message identifier, is a value signifying a restriction release request. After message generation, the PDSN 14*a* transmits the message to the P-CSCF 16*a* (Step 406).

The processing flow chart of the system controller 84 of the PDSN 14*a* is identical to that of FIG. 20. Differences are that the processing trigger is receipt of a restriction release request message, that the Step 2001 is release of a control terminal marker (i.e., clearance of the restriction address 1006 of the connection table 1000), and that the Step 2003 is restriction release request message generation.

The processing flow chart when the signaling processor 1102 of the P-CSCF 16*a* receives a restriction release request message is identical to that of FIG. 21. When, in a Step 2101, the user address 1202 of the user information table 1200 coincides with the IP address contained in the restriction release request message, the restriction state 1203 is set as "no restriction".

Due to the above procedure, in case when a terminal in the radio cell of under the base station 11*a* is ON and is still power-ON and present, terminal information which restricts or de-restricts can be notified to the PDSN 14*a* and the P-CSCF 16*a* with the change in the congestion state of the base station 11*a* as a trigger. On the other hand, terminals (power supply ON, hands-off) which have newly entered or have left the cell network under of the base station 11*a*, and terminals which have left during congestion, must be handled separately by individual processing. This processing will now be described.

First, the case where a new terminal enters the cell network or is turned on the power switch, will be described.

Figure 17:
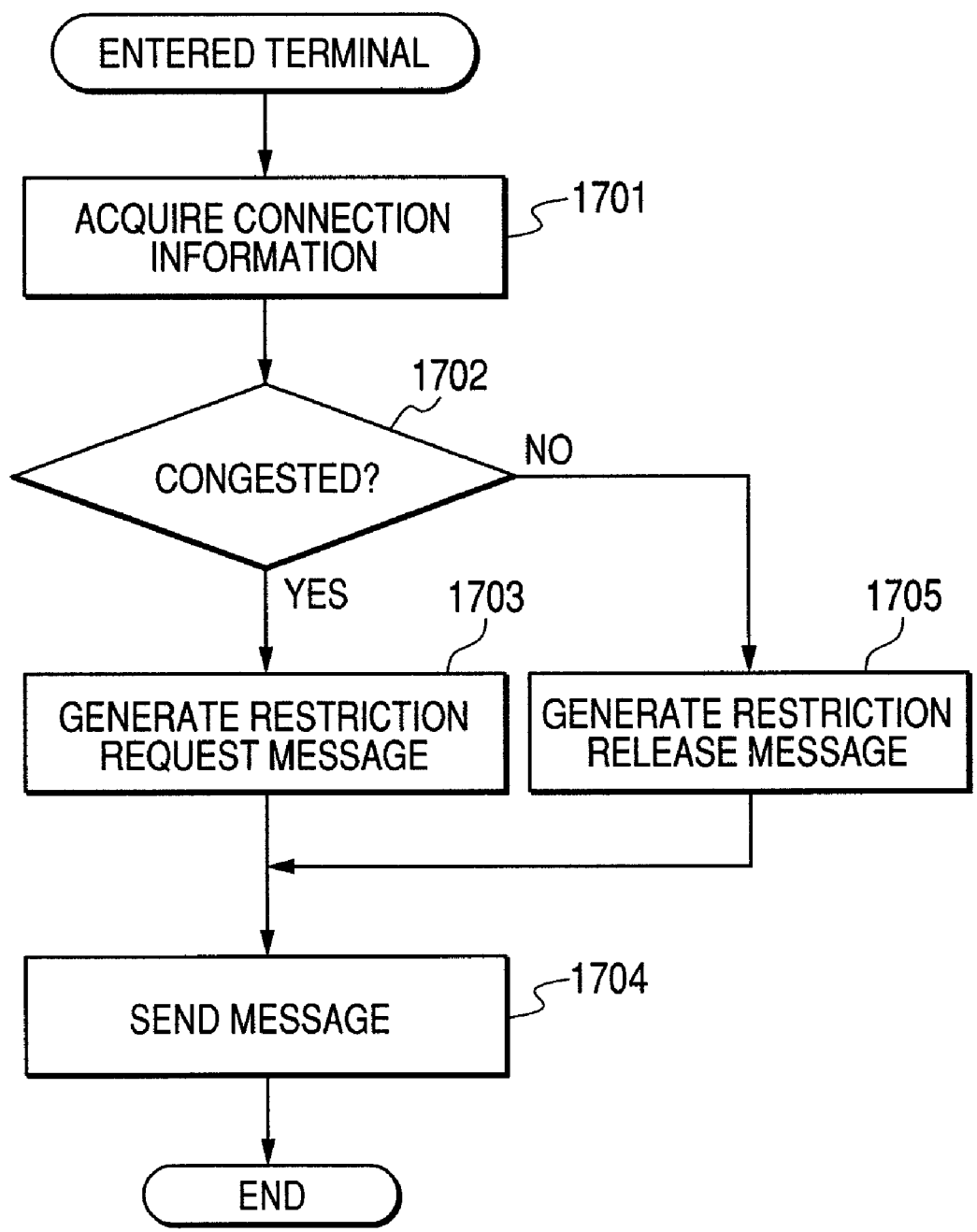
FIG. 17 is a flow chart of terminal entrance processing of a base station.

After PPP has been set up in the sequence of FIG. 2 (Step 26), the system controller 55 of the base station 11*a* executes the processing flow chart of FIG. 17 in case when new connection information is added to the connection table 60 as a trigger. First, the new connection information is extracted (Step 1701). Next, the congestion state is determined by looking up the auto-congestion managing unit (Step 1702). If there is congestion, a restriction request message containing the connection information is created (Step 1703). The message is then transmitted to the PCF 13*a* (Step 1704). If there is no congestion in the Step 1702, a restriction release request message is transmitted (Step 1705). The routine then proceeds to a Step 1704. As mentioned above, the base station 11*a* sends a restriction request or a restriction release request message to the PCF 13*a* for each terminal that enters the cell network, so that finally, the restriction information (i.e., the restriction address 1006, the restriction state 1203) of the terminal which is managed by the PDSN 14*a* and the P-CSCF 16*a* is updated to be the latest information.

Regarding the case where a terminal has left the cell or has been turned off the power. In addition, if a terminal has entered the network in the hands-off state, restriction information and corresponding to the old connections for the terminal are useless. And terminal IP addresses which was being used by the source of the hands-off remains as debris together with these connections and terminal IP addresses. By a prior art technique of connection release in case of handoff or terminal power off, the useless information is cleared. For specifying and releasing the terminal IP addresses and connections which became redundant, they may be eliminated together. This is individual processing for terminals which have left the network.

Next, the restriction method will be described. First, the restriction method for data communication will be described.

Figure 22:
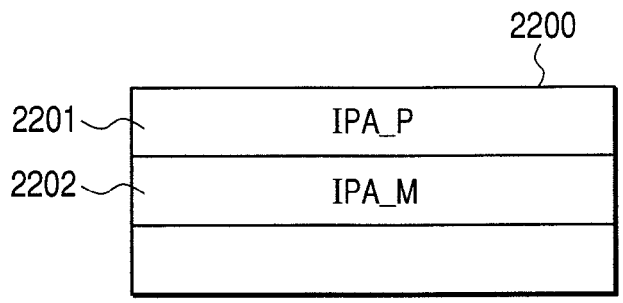
FIG. 22 is a diagram of an address permission table managed by the PDSN.

FIG. 22 shows an address permission table managed by the packet forwarding/signaling processor 82 of the PDSN 14*a*. This table manages IP addresses to which the target terminal 10*a* can establish extend a new TCP connections towards. In this example, new the TCP connections can be established extended between terminals and to the P-CSCF 16*a* or and the mail server 101*a*.

Figure 23:
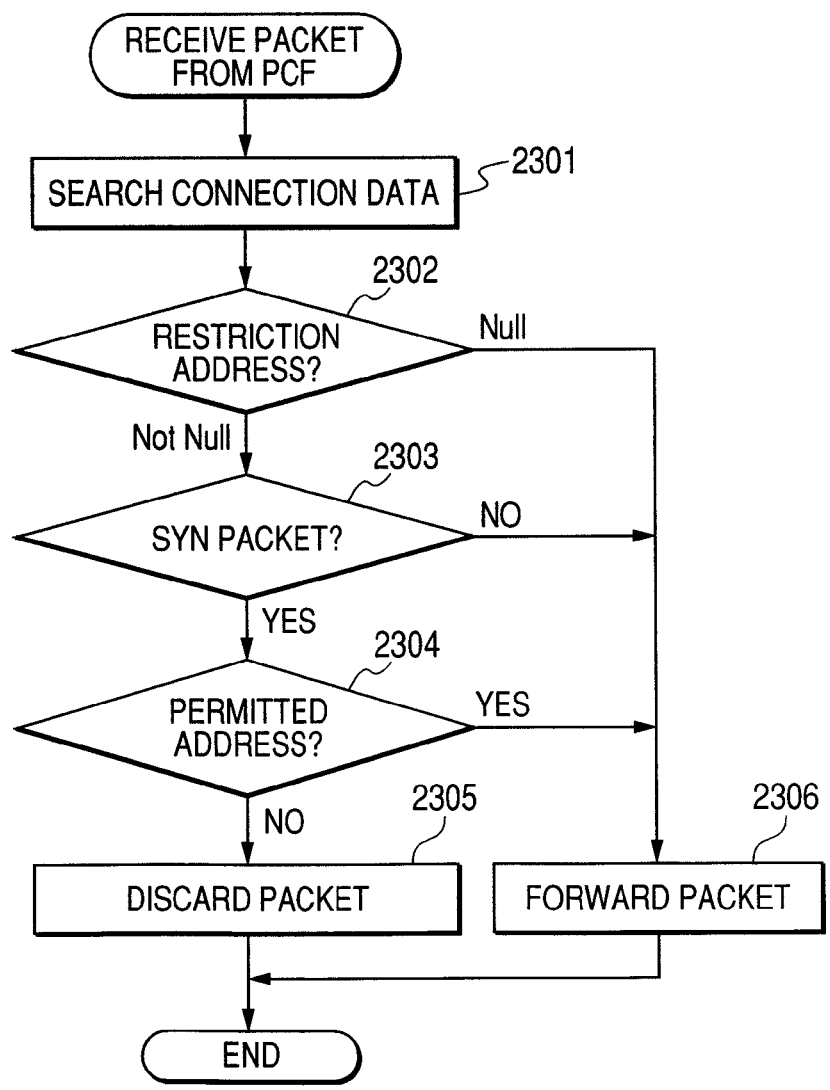
FIG. 23 is a flow chart of a data communication control processing of the PDSN.

FIG. 23 shows a processing flow of the data communication restriction performed by the packet forwarding/signaling processor 82 of the PDSN 14a. When the PDSN 14a receives an A10 packet from the PCF 13a, a connection table 1000 is looked up (Step 2301), and it is determined whether or not the correlated corresponding restriction address 1006 is Null (Step 2302). Since, if it is Null, the connection is not a restriction target, and an IP packet is extracted from the PPP frame and sent to the core network 15a via the wire line interface processor cable circuit switchbox 83 (Step 2306). If the restriction address 1006 is not Null in the Step 2302, the connection is a restriction target. It is then determined whether or not the IP packet inside the PPP frame is a SYN packet of TCP (Step 2303), and if it is not a SYN packet, the packet is forwarded as when the connection is not a restriction target (Step 2306). If the IP packet in the PPP frame is a SYN packet in the Step 2303, it is determined whether or not the destination IP address is registered in the address permission table 2200 (Step 2304). If it is registered, the packet is forwarded as when the connection is not a restriction target (Step 2306). In the Step 2304, if the destination address of the IP packet is not registered in the address permission table 2200, the IP packet is discarded (Step 2305). By the above process, TCP connections newly set up by the restriction target terminal can be limited to those which have been registered in the address permission table 2200. Even when there are restrictions, TCP packets other than SYN packets are usually passed and forwarded, and for communications in which a TCP connection has already been established, service is thereby guaranteed.

Next, a send/receive restriction for voice calls will be described. As an example, the case where the terminal 10a calls transmits to the terminal 10b (u2@ss.mc2.com) will be described. In the sequence of FIG. 3, when the terminal 10a transmits an INVITE message to the P-CSCF 16a (Step 31), the P-CSCF 16a performs the processing A32.

Figure 24:
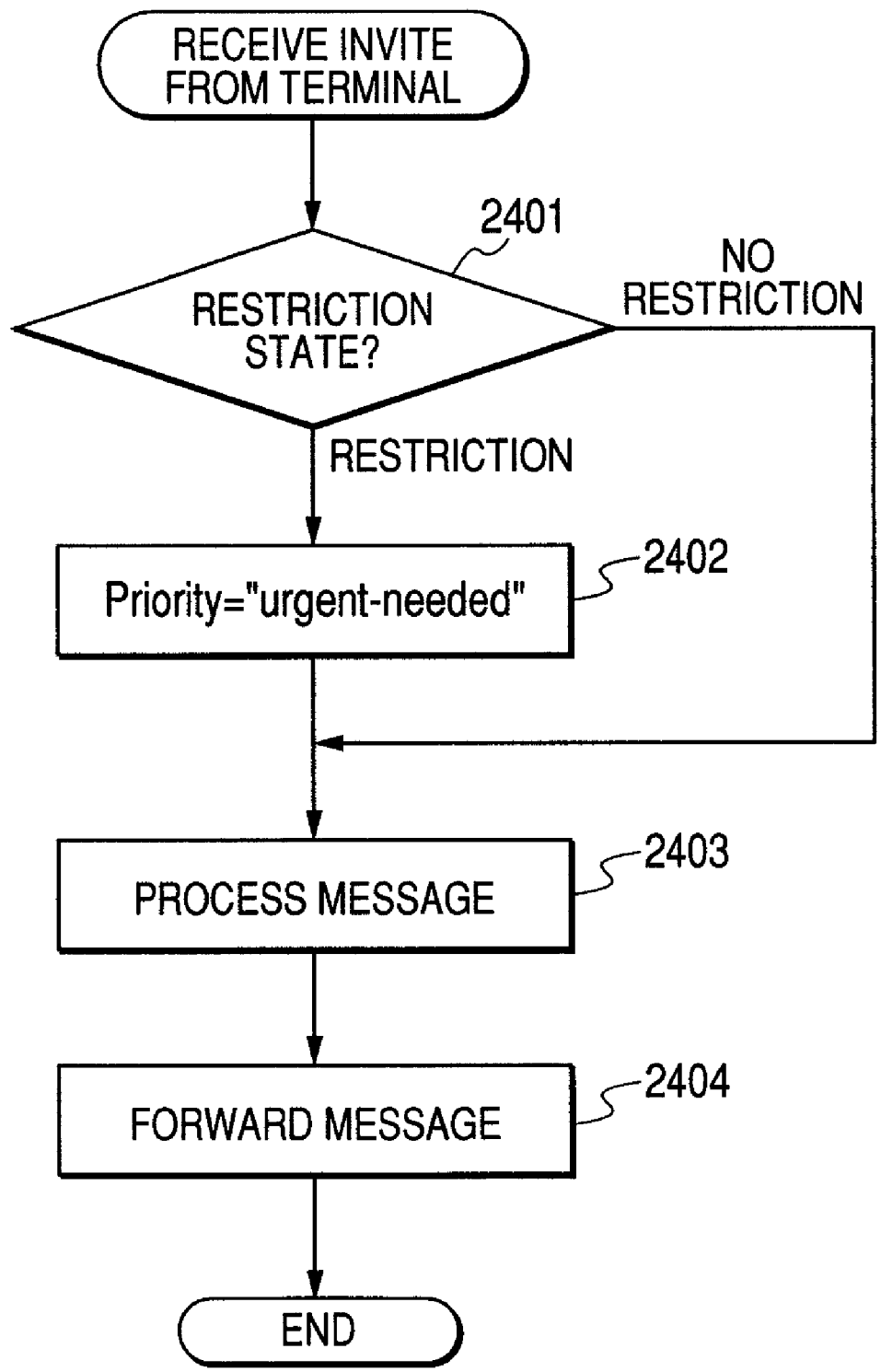
FIG. 24 is a flow chart of an INVITE message reception processing from a terminal by the P-CSCF.

FIG. 24 shows a flow chart of the processing A32. This is performed by the signaling processor 1102 of the P-CSCF 16a. When an INVITE message is received via the wire line interface processor cable circuit switchbox 1101, first, the user information table 1200 is looked up with the SIP URI contained in the From header 2501 as a key, and if the restriction state 1203 is determined (Step 2401). If the restriction state is "restriction", "urgent-needed" which means that calls other than priority calls should not be connected, is set in the Priority header 2503 of the INVITE message (Step 2402). Next, the prior art processing of the INVITE message is performed (Step 2403), and the message is transmitted to the S-CSCF 17a via the wire line interface processor cable circuit switchbox 1101 (Step 2404). If the restriction state 1203 is "no restriction" in the Step 2401, the routine proceeds to the Step 2403.

Figure 26:
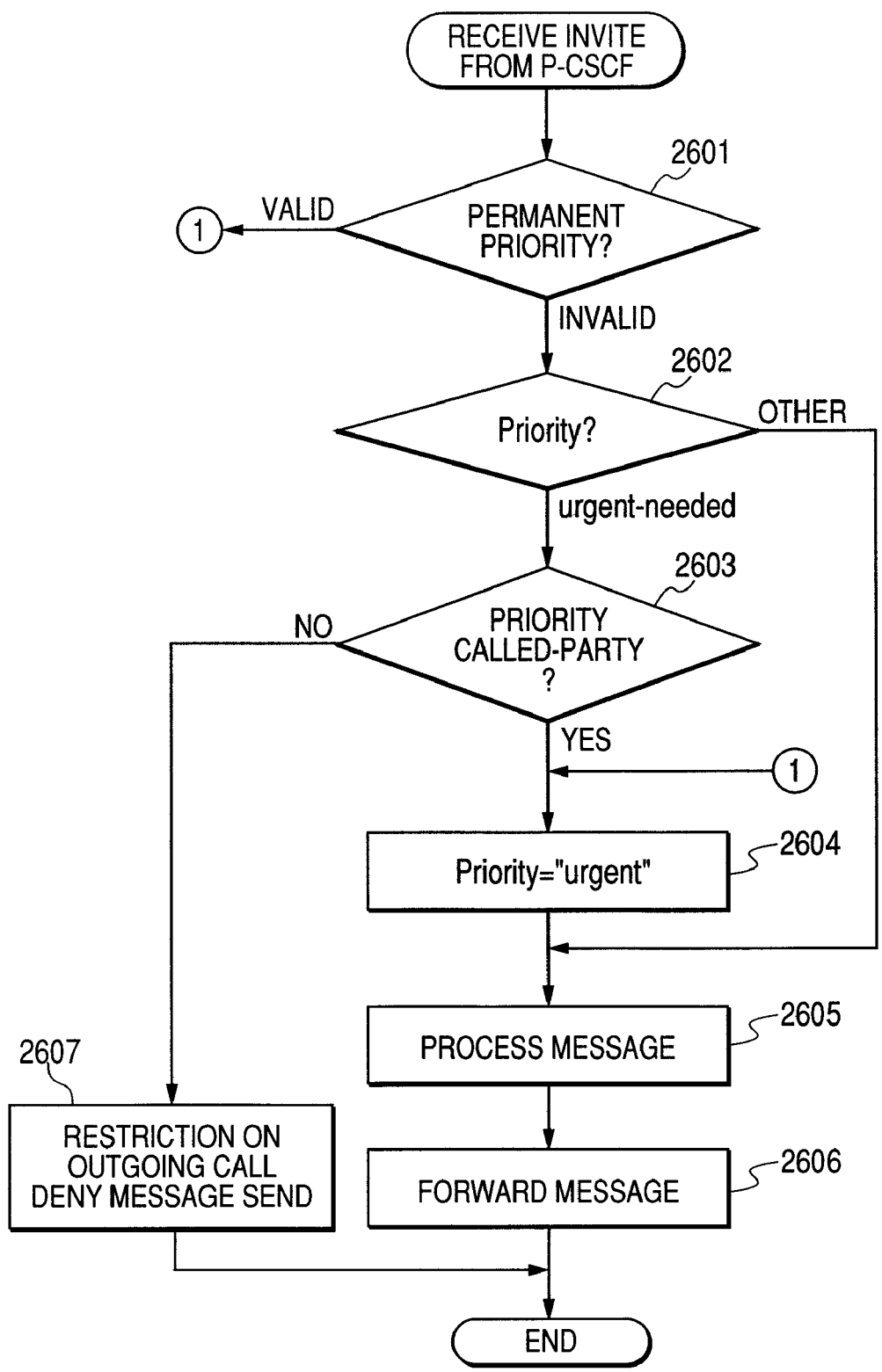
FIG. 26 is a flow chart of an INVITE message reception processing from the P-CSCF by the S-CSCF.

Returning to FIG. 3, when the S-CSCF 17a receives an INVITE message 2500 from the P-CSCF 16a, the processing B33 is performed. The processing flow chart is shown in FIG. 26. This is performed by the signaling processor 1102 of the S-CSCF 17a. When the INVITE message 2500 is received via the wire line interface processor cable circuit switchbox 1101, first, a user information table 1200 is looked up with the SIP URI contained in the From header 2501 as a key, and if a permanent priority 1204 is determined (Step 2601). If it is "valid effective", calls from the caller should always receive be priority calls connection, so in the Step 2604, a Priority 2503 of the INVITE message 2500 is set as "urgent." Next, the prior art INVITE message processing is performed (Step 2605), and the message is transmitted to I-CSCF 18b via the wire line interface processor cable circuit switchbox 1101 (Step 2606). In the Step 2601, if the permanent priority 1204 is "invalid ineffective", it is determined whether the Priority 2503 of the INVITE message 2500 is "urgent-needed" (Step 2602). If it is "urgent-needed", it is determined whether the SIP URI contained in To 2502 of the INVITE message 2500 is registered as the sending priority called-party partner 1205 of the user information table 1200 (Step 2603). If it is registered, this call should be receive priority call connection, so the routine proceeds to a Step 2604. In the Step 2603, if the SIP URI of to 2502 is not registered as the sending priority called-party partner 1205, it becomes a sending restriction on outgoing calls. A connection deny message is transmitted to the P-CSCF 16a, and call control processing is terminated (Step 2607). If the Priority 2503 is not "urgent-needed" in the Step 2602, or if the Priority 2503 itself is not contained in the message, the routine proceeds to a Step 2605.

Figure 27:
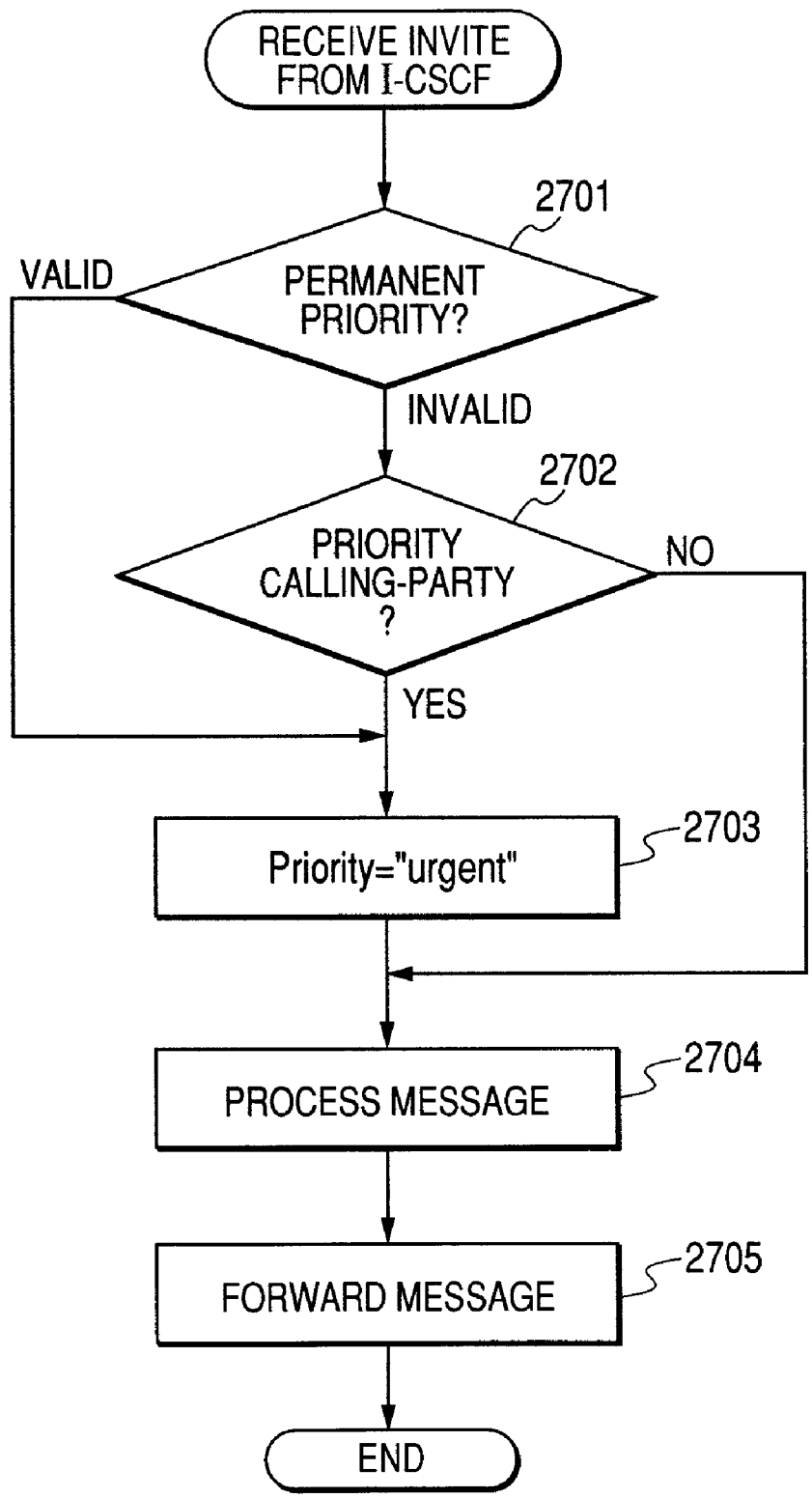
FIG. 27 is a flow chart of an INVITE message reception processing by a receiving side S-CSCF in the terminating home network.

Returning to FIG. 3, when the S-CSCF 17b receives the INVITE message 2500 from the I-CSCF 18b, the processing C35 is performed. The processing flow chart is shown in FIG. 27. This is performed by the signaling processor 1102 of the S-CSCF 17b. When the INVITE message 2500 is received via the wire line interface processor cable circuit switchbox 1101, the URI 1201 of the user information table 1200 is looked up with the SIP URI contained in To 2502 as a key, and if the correlated corresponding permanent priority 1204 is determined (Step 2701). If it is "valid effective", calls to the called receiving user should always be connected with priority calles, so in a Step 2703, the Priority 2503 of the INVITE message 2500 is set as "urgent." Next, the prior art INVITE message processing is performed (Step 2704), and the message is transmitted to the P-CSCF 16b via the wire line interface processor cable circuit switchbox 1101 (Step 2705). In the Step 2701, if the permanent priority 1204 is "invalid ineffective", it is determined whether the SIP URI contained in From 2501 of the INVITE message 2500 is registered as a receiving priority calling-party partner 1206 of the user information table 1200 (Step 2702). If it is registered, this call should be connected with a priority call, so the routine proceeds to the Step 2703. In the Step 2702, if the SIP URI of from 2501 is not registered as a receiving priority calling-party partner 1206, the routine proceeds to the Step 2704 without changing the Priority 2503.

Figure 28:
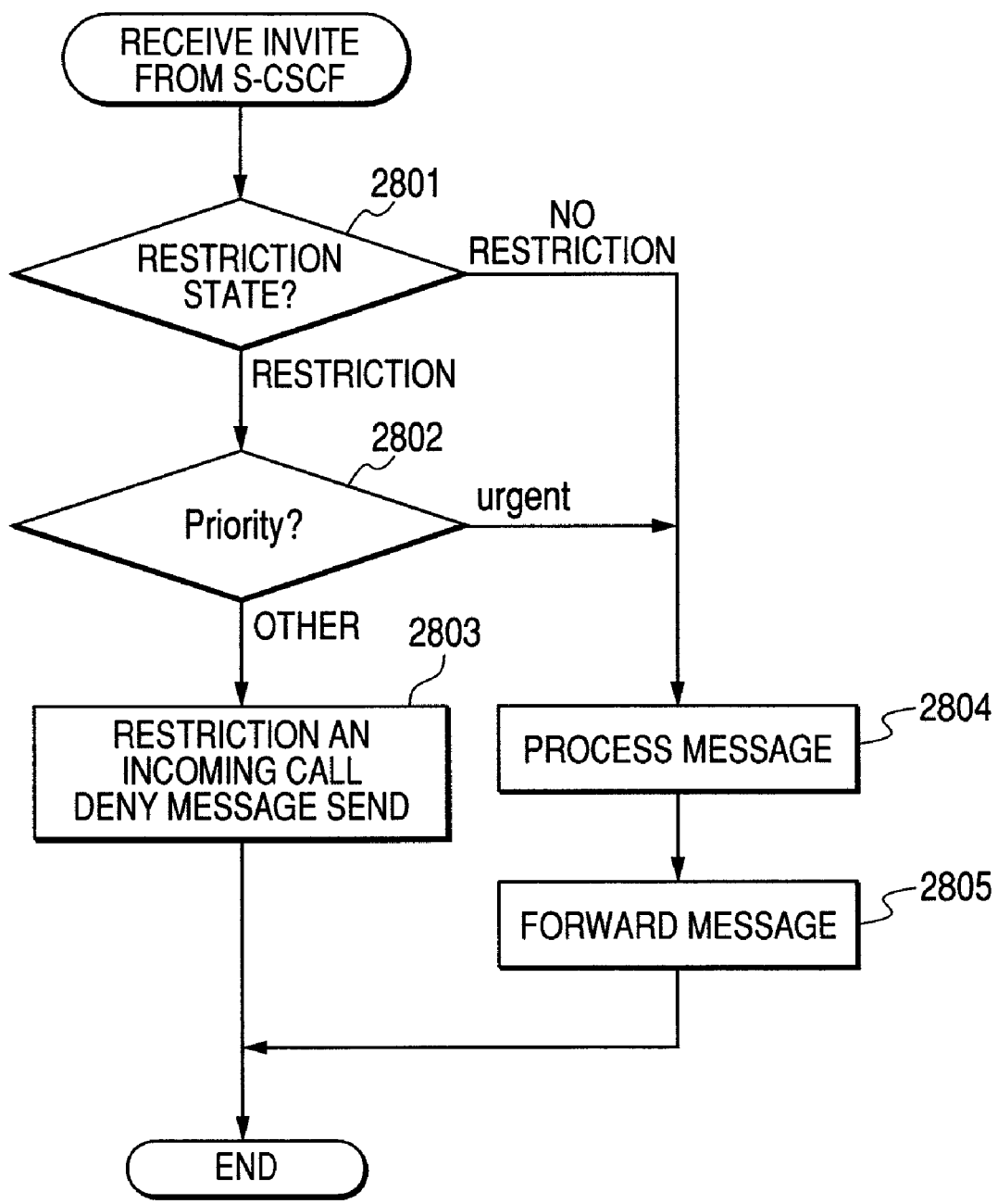
FIG. 28 is a flow chart of an INVITE message reception processing from the S-CSCF by the P-CSCF.

Returning to FIG. 3, when the P-CSCF 16b receives the INVITE message 2500 from the S-CSCF 17b, the processing D36 is performed. The processing flow chart is shown in FIG. 28. This is performed by the signaling processor 1102 of the P-CSCF 16b. When the INVITE message 2500 is received via the wire line interface processor cable circuit switchbox 1101, the URI 1201 of the user information table 1200 is looked up with the SIP URI contained in To 2502 as a key, and if the restriction state 1203 is determined (Step 2801). If the result is "restriction", it is determined whether the Priority 2503 of the INVITE message 2500 is determined (Step 2802). If it is not "urgent" (step 2802). If not "urgent", it becomes a receive restriction on incoming calls, a connection deny message is transmitted to the S-CSCF 17b, and call control processing is terminated (Step 2803). If the Priority 2503 is "urgent" in Step 2802, or if the restriction state 1203 is "no restriction" in the Step 2801, prior art message processing is performed to perform call connection (Step 2804), and an INVITE message is transmitted to the terminal 10b via the wire line interface processor cable circuit switchbox 1101 (Step 2805).

The above is the procedure relating to send/receive restrictions for voice calls.

Next, the procedure when the P-CSCF 16b of the travel destination of the receiving terminal 10b returns a connection deny message to the S-CSCF 17b, and a call is transferred received by the terminal 10*b* via to a fixed network which the terminal 10*b* connects, will be described.

Figures 29, 30:
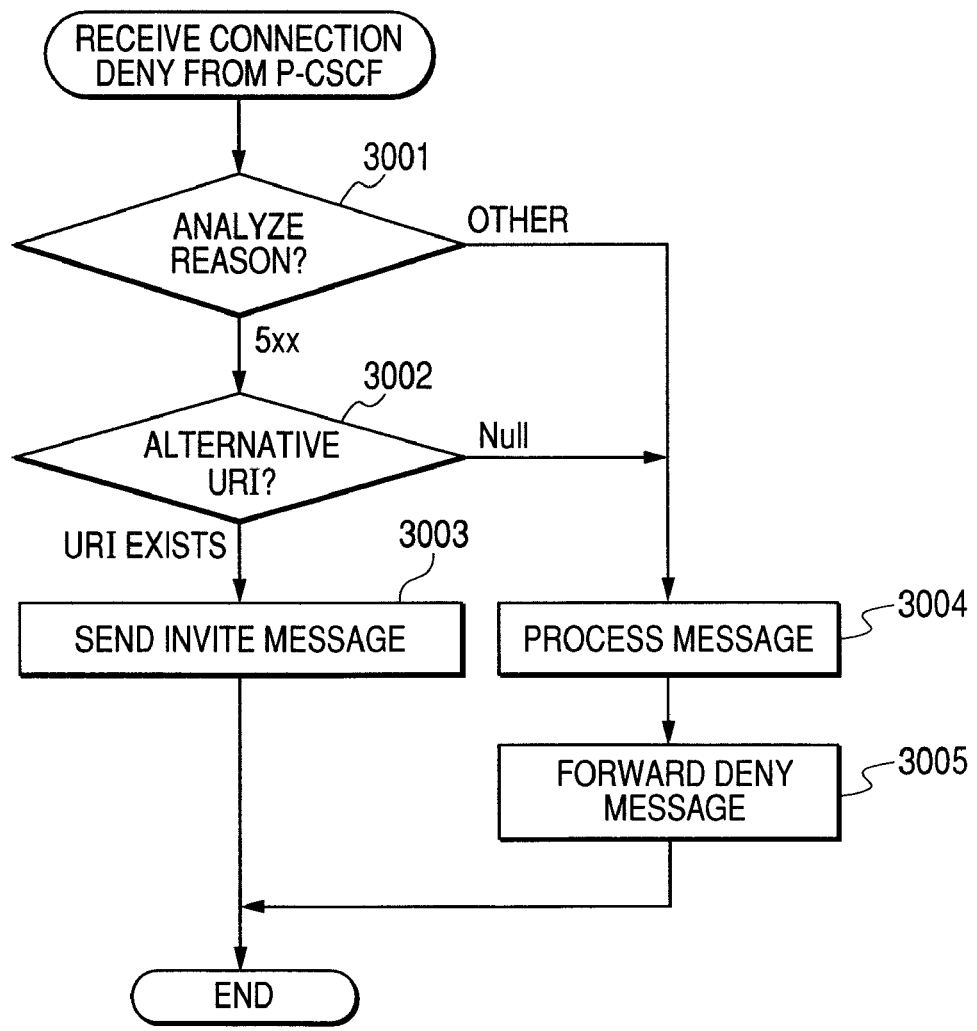
FIG. 29 is a diagram of a alternative proxy URI table managed by the S-CSCF.
FIG. 30 is a flow chart of a connection deny message receiving processing from the P-CSCF by the S-CSCF.

FIG. 29 shows an alternative proxy URI table managed by the signaling processor 1102 of the S-CSCF 17*b*. For a URI 2901 of an alternative proxy URI table 2900, the SIP URI of the user for which the mc2.com domain is home, is set. For the alternative URI 2902, another URI used by the user of the URI 2901 is set. In the example of FIG. 29, it is seen that the user of u2@ss.mc2.com also uses u2@ss.fc.com. This table is created when the terminal which uses the mc2.com domain as home performs SIP registration in the S-CSCF 17*b*.

FIG. 30 shows a processing flow when the signaling processor 1102 of the S-CSCF 17*b* receives a connection deny message from the P-CSCF 16*b*. A connection deny message is created, for example, as a result of the processing D36 of FIG. 3. First, the status code contained in an SIP response message in a Step 3001 is analyzed. Since it is known that when the status code is 5xx, the server, i.e., the P-CSCF 16*b*, determined connection refusal, the alternative proxy URI table 2900 is looked up (Step 3002). If a SIP URI is registered as the alternative proxy substitute URI 2902 corresponding to the receiving user, the INVITE message addressed to the URI is transmitted (Step 3003). When the destination URI is u2@ss.fc.com, the INVITE message is sent to transmission destination is the SIP server 19. When the SIP status code is not 5xx in the Step 3001, or when the alternative proxy URI 2902 is Null in the Step 3002, after performing processing according to a response message (Step 3004), the message is forwarded to the I-CSCF 18*b* (Step 3005).

If an INVITE message addressed to u2@ss.fc.com is received from the S-CSCF 17*b*, the SIP server 19 transmits it to the terminal 10*b* via the base station 11*d*. Hence, even when the base station 11*c*, the PCF 13*c*, or the PDSN 14*c* are congested, the user of the terminal 10*b* can receive a call addressed to u2@ss.mc2.com via the wireless LAN.

Further, even when the mail server 101*b* transmits a SIP MESSAGE message addressed to u2@ss.mc2.com (mail reception notice) to the S-CSCF 17*b*, as in the case of an INVITE message, the S-CSCF 17*b* forwards a SIP MESSAGE message to the SIP server 19 with the connection deny message from the P-CSCF 16*b* as a trigger. Hence, the terminal 10*b* can receive a mail reception notice via the base station 11*d*.

What is claimed is:

1. A communication system comprising a terminal, communication node and a higher stratum level communication node, said terminal and said higher stratum level communication node performing communication by a communication link via said terminal and said higher stratum level communication node, wherein:

said communication link is set up between said terminal and said higher stratum level communication node using an encapsulating header, and said communication node has a path link information notifying means which notifies identifying information of the communication link which passes via the communication node to the higher stratum level communication node when the processing load of the communication node exceeds a certain threshold, and the higher stratum level communication node has a target link packet filtering means which filters the packets transmitted and received using said communication link which received said notice;

said communication node includes restriction candidate IP address notifying means which specifies the IP address of said terminal from the identifying information of said communication link, and notifies a call control server;

the call control server includes restriction candidate storage means which stores the IP address notified by said restriction candidate IP address notifying means, and when said call control server is performing call connection processing for said terminal, if the IP address of the terminal is stored by said restriction candidate storage means, call connection is not performed; and wherein, when the importance parameter contained in the received call connection request message shows that a target call is important, call connection is performed even when the IP address of said terminal is stored by said restriction candidate storage means.

2. The communication system claimed in claim 1, wherein, when said call control server, after receiving a call connection request message addressed to said terminal from another call control server, decides not to perform call control processing and returns a call connection deny message to said other call control server, said other call control server which received said call connection deny message, when the forwarding destination of said terminal is set, transmits said call connection request message to this forwarding destination.

3. The communication system as claimed in claim 1, wherein, when said call control server, after receiving a mail receipt notification message addressed to said terminal from another call control server, decides not to perform call control processing and returns a call connection deny message to said other call control server, said other call control server which received said call connection deny message comprises mail receipt notification forwarding means which, when the forwarding destination of said terminal is set, transmits said mail receipt notification message to this forwarding destination.

4. A call control server in a communication system having a terminal, communication node and a higher stratum level communication node, said terminal and said higher stratum level communication node performing communication by a communication link via said terminal and said higher stratum level communication node, comprising:

said communication link being set up between said terminal and said higher stratum level communication node using an encapsulating header, and said communication node having a path link information notifying means which notifies identifying information of the communication link which passes via the communication node to the higher stratum level communication node when the processing load of the communication node exceeds a certain threshold, and the higher stratum level communication node having a target link packet filtering means which filters the packets transmitted and received using said communication link which received said notice;

said communication node including restriction candidate IP address notifying means which specifies the IP address of said terminal from the identifying information of said communication link, and notifies the call control server; and the call control server including restriction candidate storage means which stores the IP address notified by said restriction candidate IP address notifying means, and when said call control server is performing call connection processing for said terminal, if the IP address of the terminal is stored by said restriction candidate storage means, call connection is not performed, wherein, when the importance parameter contained in the received call connection request message shows that a target call is important, call connection is performed even when the IP address of said terminal is stored by said restriction candidate storage means.

5. The call control server as claimed in claim 4, wherein, when said call control server, after receiving a call connection request message addressed to said terminal from another call control server, decides not to perform call control processing and returns a call connection deny message to said other call control server, said other call control server which received said call connection deny message, when the forwarding destination of said terminal is set, transmits said call connection request message to this forwarding destination.

6. The call control server as claimed in claim 4, wherein, when said call control server, after receiving a mail receipt notification message addressed to said terminal from another call control server, decides not to perform call control processing and returns a call connection deny message to said other call control server, said other call control server which received said call connection deny message comprises mail receipt notification forwarding means which, when the forwarding destination of said terminal is set, transmits said mail receipt notification message to this forwarding destination.

* * * * *